US012665109B2

(12) United States Patent
Maekawa

(10) Patent No.: US 12,665,109 B2
(45) Date of Patent: Jun. 23, 2026

(54) CHIP RESISTOR

(71) Applicant: ROHM CO., LTD., Kyoto (JP)

(72) Inventor: Takuya Maekawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 502 days.

(21) Appl. No.: 18/248,190

(22) PCT Filed: Sep. 22, 2021

(86) PCT No.: PCT/JP2021/034736
§ 371 (c)(1),
(2) Date: Apr. 6, 2023

(87) PCT Pub. No.: WO2022/091644
PCT Pub. Date: May 5, 2022

(65) Prior Publication Data

US 2023/0368949 A1 Nov. 16, 2023

(30) Foreign Application Priority Data

Nov. 2, 2020 (JP) ................................ 2020-183492

(51) Int. Cl.
*H01C 1/032* (2006.01)
*H01C 1/148* (2006.01)
(Continued)

(52) U.S. Cl.
CPC ............ *H01C 1/032* (2013.01); *H01C 1/148* (2013.01); *H01C 7/006* (2013.01); *H01C 7/18* (2013.01)

(58) Field of Classification Search
CPC ........ H01C 1/032; H01C 1/148; H01C 7/006; H01C 7/18
See application file for complete search history.

(56) References Cited

U.S. PATENT DOCUMENTS 6,097,276 A * 8/2000 Van Den Broek ... H01C 17/232 338/308
6,943,662 B2 * 9/2005 Tanimura ............... H01C 1/142 257/537

(Continued)

FOREIGN PATENT DOCUMENTS

DE 694 09 614 T2 11/1998
JP 2001-155902 6/2001

(Continued)

OTHER PUBLICATIONS

International Search Report and Written Opinion of PCT/JP2021/034736, Dec. 14, 2021, 8 pages including English translation of the International Search Report.

(Continued)

*Primary Examiner* — Kyung S Lee
(74) *Attorney, Agent, or Firm* — HSML P.C.

(57) ABSTRACT

A chip resistor includes a substrate, a first electrode, a second electrode, a first resistor body, a second resistor body, and a connection electrode. The substrate includes a first primary surface. The first electrode includes a first terminal electrode and a first auxiliary electrode. The second electrode includes a second terminal electrode and a second auxiliary electrode. The first auxiliary electrode has a larger area than the first terminal electrode and the second auxiliary electrode has a larger area than the second terminal electrode, in plan view of the first primary surface of the substrate.

19 Claims, 8 Drawing Sheets

(51) Int. Cl.
*H01C 7/00* (2006.01)
*H01C 7/18* (2006.01)

(56) References Cited

U.S. PATENT DOCUMENTS

| | | | | | |
|---|---|---|---|---|---|
| 9,754,705 | B2 * | 9/2017 | Kim | H05K 1/181 |
| 10,242,774 | B2 * | 3/2019 | Nam | H01C 1/148 |
| 10,269,474 | B2 * | 4/2019 | Yun | H01C 17/22 |
| 2016/0172084 | A1 * | 6/2016 | Nam | H01C 1/012<br>338/307 |
| 2016/0247610 | A1 * | 8/2016 | Shinoura | H01C 1/142 |
| 2017/0202089 | A1 * | 7/2017 | Yun | H01C 1/148 |
| 2018/0130578 | A1 * | 5/2018 | Yun | H01C 7/06 |
| 2018/0315810 | A1 * | 11/2018 | Yoo | H01C 1/01 |

FOREIGN PATENT DOCUMENTS

| | | |
|---|---|---|
| JP | 2004-200424 | 7/2004 |
| JP | 2008-078294 | 4/2008 |
| JP | 2011-044551 | 3/2011 |
| JP | 2014-165194 | 9/2014 |
| JP | 2018-006726 | 1/2018 |
| JP | 2018-074137 | 5/2018 |
| JP | 2020-178021 | 10/2020 |

OTHER PUBLICATIONS

Office Action issued in counterpart German Patent Application No. 11 2021 005 034.6, Jun. 24, 2024, 16 pages w/ translation.
Office Action issued in counterpart Japanese Patent Application No. 2022-558919, Oct. 28, 2025, 6 pages w/ translation.
Office Action issued in counterpart Japanese Patent Application No. 2022-558919, Aug. 12, 2025, 7 pages w/ translation.

* cited by examiner

CHIP RESISTOR

TECHNICAL FIELD

The present disclosure relates to a chip resistor.

BACKGROUND ART

Japanese Patent Laying-Open No. 2004-200424 (PTL 1) discloses a chip resistor which includes a first electrode, a first resistor body, a conductor film, a second resistor body, and a second electrode. The first electrode is connected to the first resistor body. The second electrode is connected to the second resistor body. The conductor film electrically connects in series the first resistor body and the second resistor body.

CITATION LIST

Patent Literature

PTL 1: Japanese Patent Laying-Open No. 2004-200424

SUMMARY OF INVENTION

Technical Problem

While the chip resistor disclosed in PTL 1 is in use, the temperature of the chip resistor excessively increases, which causes the chip resistor to deteriorate. The present disclosure is made in view of the above problem, and an object of the present disclose is to provide a chip resistor having improved heat dissipation.

Solution to Problem

A chip resistor according to a first aspect of the present disclosure includes a substrate, a first electrode, a second electrode, a first resistor body, a second resistor body, and a connection electrode. The substrate includes a primary surface, a first end surface connected to the primary surface, and a second end surface connected to the primary surface. The first electrode is disposed on a first end surface side of the substrate. The second electrode is disposed on a second end surface side of the substrate. The first resistor body is disposed on the primary surface. The second resistor body is disposed on the primary surface and spaced apart from the first resistor body in a longitudinal direction of the substrate in which the first end surface and the second end surface are spaced apart from each other. The connection electrode is disposed on the primary surface and electrically connects in series the first resistor body and the second resistor body. The first electrode includes a first terminal electrode and a first auxiliary electrode. The first terminal electrode is disposed on the primary surface and connected to the first resistor body. The first auxiliary electrode is connected to the first terminal electrode. The second electrode includes a second terminal electrode and a second auxiliary electrode. The second terminal electrode is disposed on the primary surface and connected to the second resistor body. The second auxiliary electrode is connected to the second terminal electrode. The first auxiliary electrode has a larger area than the first terminal electrode and the second auxiliary electrode has a larger area than the second terminal electrode, in plan view of the primary surface.

The chip resistor according to the second aspect of the present disclosure includes a substrate, a first electrode, a second electrode, a first resistor body, a second resistor body, and a connection electrode. The substrate includes a primary surface, a first end surface connected to the primary surface, and a second end surface connected to the primary surface. The first electrode is disposed on a first end surface side of the substrate. The second electrode is disposed on a second end surface side of the substrate. The first resistor body is disposed on the primary surface. The second resistor body is disposed on the primary surface and spaced apart from the first resistor body in a longitudinal direction of the substrate in which the first end surface and the second end surface are spaced apart from each other. The connection electrode is disposed on the primary surface and electrically connects in series the first resistor body and the second resistor body. The first electrode includes a first terminal electrode. The first terminal electrode is disposed on the primary surface and connected to the first resistor body. The second electrode includes a second terminal electrode. The second terminal electrode is disposed on the primary surface and connected to the second resistor body. The first gap between the first resistor body and the first end surface in the longitudinal direction of the substrate in plan view of the primary surface is less than or equal to 0.3 mm when a dimension of the substrate in the longitudinal direction of the substrate is greater than or equal to 1.6 mm, and less than or equal to 0.15 mm when the dimension of the substrate in the longitudinal direction of the substrate is greater than or equal to 0.6 mm and less than 1.6 mm. The second gap between the second resistor body and the second end surface in the longitudinal direction of the substrate in in the plan view of the primary surface is less than or equal to 0.3 mm when the dimension of the substrate in the longitudinal direction of the substrate is greater than or equal to 1.6 mm, and less than or equal to 0.15 mm when the dimension of the substrate in the longitudinal direction of the substrate is greater than or equal to 0.6 mm and less than 1.6 mm.

Advantageous Effects of Invention

The chip resistors according to the first aspect and the second aspect of the present disclosure have improved heat dissipation.

DESCRIPTION OF EMBODIMENTS

Hereinafter, an embodiment will be described. Note that like reference number refers to like configurations, and description thereof will not be repeated.

Embodiment

Figure 1:
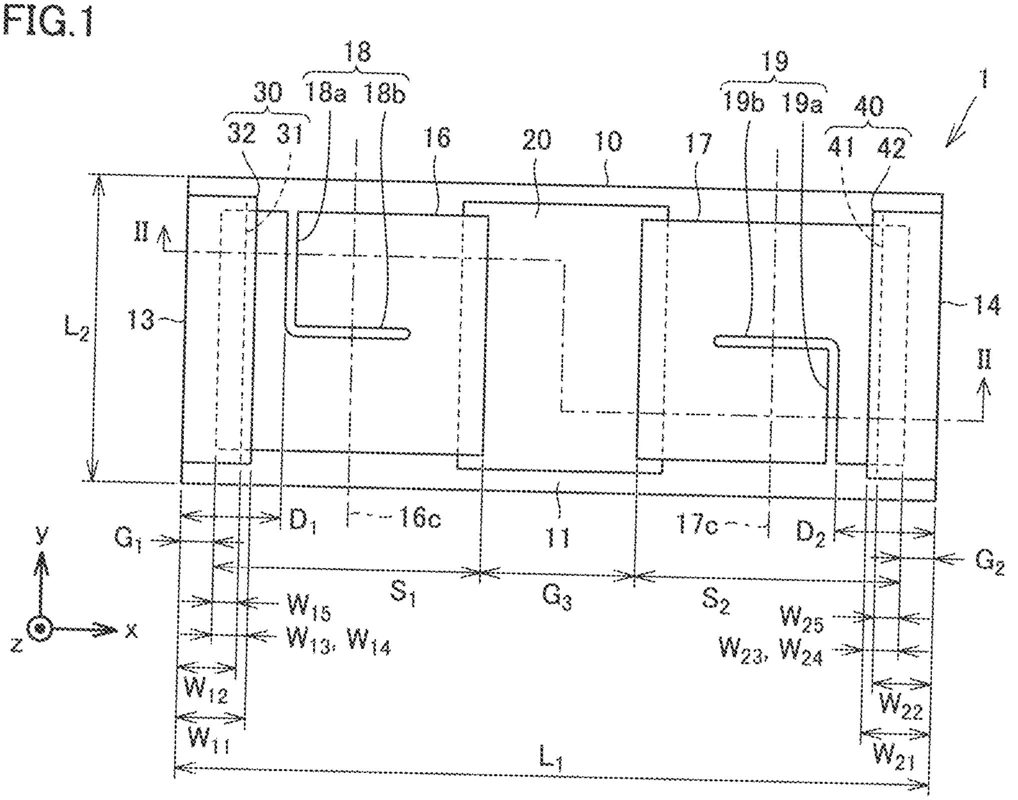
FIG. 1 is a schematic plan view of a chip resistor according to an embodiment.
Figure 2:
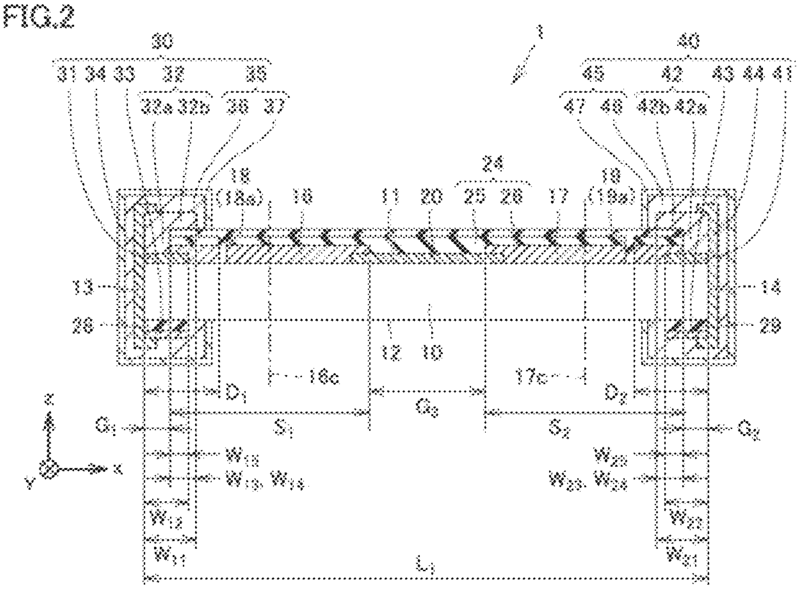
FIG. 2 is a schematic cross-sectional view of the chip resistor according to the embodiment, taken along a section line II-II of FIG. 1.

Referring to FIGS. 1 and 2, a chip resistor 1 according to the embodiment is now described. The chip resistor 1 primarily includes a substrate 10, a first resistor body 16, a second resistor body 17, a connection electrode 20, a first electrode 30, and a second electrode 40. The chip resistor 1 may further include an insulating protective film 24. The chip resistor 1 may further include a first stress relief layer 28 and a second stress relief layer 29. For illustrative purposes, part of the first electrode 30, part of the second electrode 40, the insulating protective film 24, the first stress relief layer 28, and the second stress relief layer 29 are omitted in FIG. 1.

The substrate 10 is an electrical insulator formed of an electrically insulating material such as alumina ($Al_2O_3$). The substrate 10 includes a first primary surface 11, a second primary surface 12 opposite the first primary surface 11, a first end surface 13, and a second end surface 14 opposite the first end surface 13. The first primary surface 11 and the second primary surface 12 extend along a first direction (x direction) and a second direction (y direction) perpendicular to the first direction. The first direction (x direction) is the longitudinal direction of the substrate 10. The second direction (y direction) is the lateral direction of the substrate 10. The first primary surface 11 and the second primary surface 12 are spaced apart from each other in a third direction (z direction) that is perpendicular to the first direction (x direction) and the second direction (y direction). The third direction (z direction) is the direction of thickness of the substrate 10. As the chip resistor 1 is mounted on a circuit board (not shown), the second primary surface 12 faces the circuit board.

A dimension $L_1$ of the substrate 10 in the longitudinal direction (x direction) of the substrate 10 is, but not particularly limited to, greater than or equal to 0.6 mm and less than or equal to 6.4 mm, for example. A dimension $L_2$ of the substrate 10 in the lateral direction (y direction) of the substrate 10 is, but not particularly limited to, greater than or equal to 0.3 mm and less than or equal to 3.2 mm, for example. The dimension $L_1$ of the substrate 10 is greater than or equal to 1.25 times the dimension $L_2$ of the substrate 10 and less than or equal to 2.25 times the dimension $L_2$ of the substrate 10, for example. The size of the substrate 10 in plan view of the first primary surface 11 is represented by the dimension $L_1$×the dimension $L_2$, which is, for example, 6.4 mm×3.2 mm, 5.0 mm×2.5 mm, 3.2 mm×2.5 mm, 3.2 mm×1.6 mm, 2.0 mm×1.2 mm, 1.6 mm×0.8 mm, 1.0 mm×0.5 mm, or 0.6 mm×0.3 mm.

The first end surface 13 is connected to the first primary surface 11 and the second primary surface 12. The second end surface 14 is connected to the first primary surface 11 and the second primary surface 12. The first end surface 13 and the second end surface 14 extend along the second direction (y direction) and the third direction (z direction). The first end surface 13 and the second end surface 14 are spaced apart from each other in the first direction (x direction).

The first resistor body 16 and the second resistor body 17 have a function of restricting the current or a function of detecting the current, for example. The first resistor body 16 and the second resistor body 17 are disposed on the first primary surface 11 of the substrate 10. The first resistor body 16 and the second resistor body 17 are formed by, for example, printing and firing a paste containing an electrically resistive material, such as ruthenium oxide ($RuO_2$) or a silver-palladium alloy, mixed with glass frit on the first primary surface 11 of the substrate 10. The first resistor body 16 and the second resistor body 17 each have, for example, a rectangular shape in plan view of the first primary surface 11 of the substrate 10. The first resistor body 16 and the second resistor body 17 are arranged in the longitudinal direction (z direction) of the substrate 10. The first resistor body 16 and the second resistor body 17 are spaced apart from each other by a third gap $G_3$ in the longitudinal direction (z direction) of the substrate 10.

The first resistor body 16 is disposed on the first end surface 13 side of the substrate 10. The first resistor body 16 is closer to the first end surface 13 than the second resistor body 17 is.

A first gap $G_1$ between the first resistor body 16 and the first end surface 13 in the longitudinal direction (x direction) of the substrate 10 in plan view of the first primary surface 11 of the substrate 10 is less than or equal to 0.3 mm if the dimension $L_1$ of the substrate 10 in the longitudinal direction (x direction) of the substrate 10 is greater than or equal to 1.6 mm, and less than or equal to 0.15 mm if the dimension $L_1$ of the substrate 10 in the longitudinal direction (x direction) of the substrate 10 is greater than or equal to 0.6 mm and less than 1.6 mm, for example. The first gap $G_1$ may be less than or equal to 0.2 mm if the dimension $L_1$ of the substrate 10 in the longitudinal direction (x direction) of the substrate 10 is greater than or equal to 1.6 5 mm, and less than or equal to 0.10 mm if the dimension $L_1$ of the substrate 10 in the longitudinal direction (x direction) of the substrate 10 is greater than or equal to 0.6 mm and less than 1.6 mm. The first gap $G_1$ between the first resistor body 16 and the first end surface 13 is less than the third gap $G_3$ between the first resistor body 16 and the second resistor body 17 in the longitudinal direction (x direction) of the substrate 10.

A first trimming groove 18 is formed in the first resistor body 16. Forming the first trimming groove 18 in the first resistor body 16 allows accurate determination of the resistance of the chip resistor 1 (the first resistor body 16).

For example, the first trimming groove 18 may have an L shape in plan view of the first primary surface 11 of the substrate 10. Specifically, the first trimming groove 18 includes a trimming groove portion 18*a* and a trimming groove portion 18*b* in plan view of the first primary surface 11 of the substrate 10. The trimming groove portion 18*a* extends along a direction (the lateral direction of the substrate 10 (y direction)) perpendicular to the direction (the longitudinal direction of the substrate 10 (x direction)) of the current flowing through the first resistor body 16. The trimming groove portion 18*a* has one end extending to the outer circumference of the first resistor body 16. The trimming groove portion 18*b* extends along a direction (the longitudinal direction of the substrate 10 (x direction)) of the current flowing through the first resistor body 16. The trimming groove portion 18*b* extends from the trimming groove portion 18*a* toward the connection electrode 20 in plan view of the first primary surface 11 of the substrate 10. The trimming groove portion 18*a* has the other end connected to the trimming groove portion 18*b*.

A shortest distance Di between the first end surface 13 and the first trimming groove 18 in the longitudinal direction (x direction) of the substrate 10 is, for example, less than or equal to the sum of the first gap $G_1$ and one third of the dimension $S_1$ of the first resistor body 16 in the longitudinal direction (x direction) of the substrate 10. The shortest distance $D_1$ may be less than or equal to 1.00 mm. In the present embodiment, the shortest distance $D_1$ is the distance between the first end surface 13 and the trimming groove portion 18*a* in the longitudinal direction (x direction) of the substrate 10. The trimming groove portion 18*a* of the first trimming groove 18 that has the shortest distance from the first end surface 13 is closer to the first end surface 13 than the first centerline 16*c* of the first resistor body 16 in the longitudinal direction (x direction) of the substrate 10 is.

The second resistor body 17 is disposed on the second end surface 14 side of the substrate 10. The second resistor body 17 is closer to the second end surface 14 than the first resistor body 16 is.

A second gap $G_2$ between the second resistor body 17 and the second end surface 14 in the longitudinal direction (x direction) of the substrate 10 in plan view of the first primary surface 11 of the substrate 10 is, for example, less than or equal to 0.3 mm if the dimension $L_1$ of the substrate 10 in the longitudinal direction (x direction) of the substrate 10 is greater than or equal to 1.6 mm, and less than or equal to 0.15 mm if the dimension $L_1$ of the substrate 10 in the longitudinal direction (x direction) of the substrate 10 is greater than or equal to 0.6 mm and less than 1.6 mm. The second gap $G_2$ may be less than or equal to 0.2 mm if the dimension $L_1$ of the substrate 10 in the longitudinal direction (x direction) of the substrate 10 is greater than or equal to 1.6 mm, and less than or equal to 0.10 mm if the dimension $L_1$ of the substrate 10 in the longitudinal direction (x direction) of the substrate 10 is greater than or equal to 0.6 mm and less than 1.6 mm. The second gap $G_2$ between the second resistor body 17 and the second end surface 14 is less than the third gap $G_3$ between the first resistor body 16 and the second resistor body 17 in the longitudinal direction (x direction) of the substrate 10.

A second trimming groove 19 is formed in the second resistor body 17. Forming the second trimming groove 19 in the second resistor body 17 allows accurate determination of the resistance of the chip resistor 1 (the second resistor body 17).

For example, the second trimming groove 19 may have an L shape in plan view of the first primary surface 11 of the substrate 10. Specifically, the second trimming groove 19 includes a trimming groove portion 19*a* and a trimming groove portion 19*b* in plan view of the first primary surface 11 of the substrate 10. The trimming groove portion 19*a* extends along a direction (the lateral direction of the substrate 10 (y direction)) perpendicular to the direction (the longitudinal direction of the substrate 10 (x direction)) of the current flowing through the second resistor body 17. The trimming groove portion 19*a* has one end extending to the outer circumference of the second resistor body 17. The trimming groove portion 19*b* extends along a direction (the longitudinal direction of the substrate 10 (x direction)) of the current flowing through the second resistor body 17. The trimming groove portion 19*b* extends from the trimming groove portion 19*a* toward the connection electrode 20 in plan view of the first primary surface 11 of the substrate 10. The trimming groove portion 19*a* has the other end connected to the trimming groove portion 19*b*.

A shortest distance $D_2$ between the second end surface 14 and the second trimming groove 19 in the longitudinal direction (x direction) of the substrate 10 is, for example, less than or equal to the sum of the second gap $G_2$ and one third of the dimension $S_2$ of the second resistor body 17 in the longitudinal direction (x direction) of the substrate 10. The shortest distance $D_2$ may be less than or equal to 1.00 mm. In the present embodiment, the shortest distance $D_2$ is the distance between the second end surface 14 and the trimming groove portion 19*a* in the longitudinal direction (x direction) of the substrate 10. The trimming groove portion 19*a* of the second trimming groove 19 that has the shortest distance from the second end surface 14 is closer to the second end surface 14 than the second centerline 17*c* of the second resistor body 17 in the longitudinal direction (x direction) of the substrate 10 is.

The connection electrode 20 is disposed on the first primary surface 11 of the substrate 10. The connection electrode 20 electrically connects in series the first resistor body 16 and the second resistor body 17. The connection electrode 20 has one end portion between the first primary surface 11 and the first resistor body 16. The connection electrode 20 has the other end portion between the first primary surface 11 and the second resistor body 17. The first resistor body 16 may have the one end portion between the first primary surface 11 and the connection electrode 20. The second resistor body 17 may have the one end portion between the first primary surface 11 and the connection electrode 20. The connection electrode 20 is formed by, for example, printing and firing a conductive paste, such as a paste containing silver mixed with glass frit, on the first primary surface 11 of the substrate 10.

The insulating protective film 24 covers the first resistor body 16 and the second resistor body 17, protecting the first resistor body 16 and the second resistor body 17. The insulating protective film 24 may further cover the connection electrode 20. The insulating protective film 24 may further cover part of a first terminal electrode 31 and part of a second terminal electrode 41. The insulating protective film 24 is located between a first auxiliary electrode 32 (a first canopy portion 32*b*) and the first resistor body 16, and between a second auxiliary electrode 42 (a second canopy portion 42*b*) and the second resistor body 17. The insulating protective film 24 includes an inner insulating protective layer 25 and an outer insulating protective layer 26.

The inner insulating protective layer 25 is in contact with the first resistor body 16 and the second resistor body 17, covering the first resistor body 16 and the second resistor body 17. The inner insulating protective layer 25 may be further in contact with the connection electrode 20, further covering the connection electrode 20. The inner insulating protective layer 25 may be in contact with part of the first terminal electrode 31 and part of the second terminal electrode 41, further covering part of the first terminal electrode 31 and part of the second terminal electrode 41. The inner insulating protective layer 25 may fill the first trimming groove 18 and the second trimming groove 19. The inner insulating protective layer 25 is formed of an insulating material such as a glass, for example. The inner insulating protective layer is formed by, for example, printing and firing a paste containing a glass on the inner insulating protective layer 25. The outer insulating protective layer 26 is disposed on the inner insulating protective layer 25. The outer insulating protective layer 26 is formed of an electrically insulating resin such as an epoxy resin, for example. The outer insulating protective layer 26 is formed by, for example, printing and curing a paste containing an epoxy resin on the outer insulating protective layer 26.

The first stress relief layer 28 and the second stress relief layer 29 are disposed on the second primary surface 12 of the substrate 10. The first stress relief layer 28 is disposed at a location on the second primary surface 12 that is close to the first end surface 13. The second stress relief layer 29 is disposed at a location on the second primary surface 12 that is close to the second end surface 14. The first stress relief layer 28 may have substantially the same shape as the first terminal electrode 31 in plan view of the first primary surface 11 (or the second primary surface 12) of the substrate 10. The second stress relief layer 29 may have substantially the same shape as the second terminal electrode 41 in plan view of the first primary surface 11 (or the second primary surface 12) of the substrate 10.

The first stress relief layer 28 and the second stress relief layer 29 are flexible. The first stress relief layer 28 and the second stress relief layer 29 relieve the thermal stress caused by a difference between the coefficient of thermal expansion of the circuit board and the coefficient of thermal expansion of the chip resistor 1 (the substrate 10) when the chip resistor 1 is mounted on a circuit board (not shown), thereby preventing the chip resistor 1 from developing cracks.

The first stress relief layer 28 and the second stress relief layer 29 each have a thickness that is greater than or equal to 3 μm and less than or equal to 50 μm, for example. Since the first stress relief layer 28 and the second stress relief layer 29 each have the thickness greater than or equal to 3 μm, the first stress relief layer 28 and the second stress relief layer 29 are sufficiently flexible to relieve the thermal stress mentioned above. Since the first stress relief layer 28 and the second stress relief layer 29 each have the thickness less than or equal to 50 μm, the chip resistor 1 having a reduced size is achieved. Since the first stress relief layer 28 and the second stress relief layer 29 each have the thickness less than or equal to 50 μm, it takes less time to cure the first stress relief layer 28 and the second stress relief layer 29, thereby taking less time to fabricate the chip resistor 1.

The first stress relief layer 28 and the second stress relief layer 29 are formed of a flexible, electrically insulating resin such as an epoxy resin or a silicone resin, for example. The first stress relief layer 28 and the second stress relief layer 29 are formed by, for example, printing and curing a resin paste on the second primary surface 12 of the substrate 10. The first stress relief layer 28 and the second stress relief layer 29 may be formed of an electrically conductive resin containing conductive particles such as silver particles, for example.

The first electrode 30 is disposed on the first end surface 13 side of the substrate 10, and connected to the first resistor body 16. The first electrode 30 includes, a first terminal electrode 31, a first auxiliary electrode 32, a first metal thin film layer 33, a first side electrode 34, and a first plating film 35.

The first terminal electrode 31 is disposed on the first primary surface 11 of the substrate 10. The first terminal electrode 31 is closer to the first end surface 13 than the connection electrode 20 is. The first terminal electrode 31 is connected to the first resistor body 16. The first terminal electrode 31 has one end portion between the first primary surface 11 and the first resistor body 16. The first resistor body 16 may have one end portion between the first primary surface 11 and the first terminal electrode 31. The first terminal electrode 31 overlaps the insulating protective film 24 in plan view of the first primary surface 11 of the substrate 10. The first terminal electrode 31, for example, has a rectangular shape in plan view of the first primary surface 11 of the substrate 10. The first terminal electrode 31 is formed by applying and firing a conductive paste, such as a paste containing silver mixed with glass frit on the first primary surface 11 of the substrate 10, for example.

The first auxiliary electrode 32 is disposed on the first terminal electrode 31 and connected to the first terminal electrode 31. The first auxiliary electrode 32 is also disposed on the insulating protective film 24 (the outer insulating protective layer 26). Specifically, the first auxiliary electrode 32 includes a first base **32*a* and the first canopy portion 32*b*. The first base 32*a* is disposed on the first terminal electrode 31 and in contact with the first terminal electrode 31. The first canopy portion 32*b* projects from the first base 32*a* toward the connection electrode 20. The first canopy portion 32*b* is in contact with the insulating protective film 24 (the outer insulating protective layer 26**).

The first auxiliary electrode 32 overlaps the first resistor body 16 in plan view of the first primary surface 11 of the substrate 10. A first overlap width $W_{13}$ between the first auxiliary electrode 32 and the first resistor body 16 in the longitudinal direction (x direction) of the substrate 10 is greater than or equal to the first gap $G_1$ between the first resistor body 16 and the first end surface 13 in the longitudinal direction of the substrate 10. The first auxiliary electrode 32 (the first canopy portion **32*b*) overlaps the insulating protective film 24 in plan view of the first primary surface 11 of the substrate 10. A third overlap width $W_{14}$ between the first auxiliary electrode 32 and the insulating protective film 24 in the longitudinal direction of the substrate 10 is greater than a fourth overlap width $W_{15}$ between the first terminal electrode 31 and the insulating protective film 24 in the longitudinal direction of the substrate 10**.

The first auxiliary electrode 32 has a larger area than the first terminal electrode 31 in plan view of the first primary surface 11 of the substrate 10. A first width $W_{11}$ of the first auxiliary electrode 32 in the longitudinal direction (x direction) of the substrate 10 is greater than a first electrode width $W_{12}$ of the first terminal electrode 31 in the longitudinal direction of the substrate 10. The first width $W_{11}$ of the first auxiliary electrode 32 in the longitudinal direction of the substrate 10 is greater than or equal to the first gap $G_1$ between the first resistor body 16 and the first end surface 13 in the longitudinal direction of the substrate 10. The first auxiliary electrode 32 has a maximum thickness greater than a maximum thickness of the first terminal electrode 31. The first auxiliary electrode 32 has a larger volume than the first terminal electrode 31. For example, the first auxiliary electrode 32 is formed by applying and firing a conductive paste, such as a silver paste containing a binder resin and silver particles dispersed in the binder resin, on the first terminal electrode 31 and on the insulating protective film 24 (the outer insulating protective layer 26).

The first metal thin film layer 33 is disposed on the first stress relief layer 28. Even if the first stress relief layer 28 is an electrical insulator, the first metal thin film layer 33 enables the first plating film 35 to be formed on the first stress relief layer 28. For example, the first metal thin film layer 33 is formed of a conductive material such as a silver paste containing a binder resin and silver particles dispersed in the binder resin. For example, the first metal thin film layer 33 is formed by printing on the first stress relief layer 28 a conductive paste such as a silver paste containing a binder resin and silver particles dispersed in the binder resin.

The first side electrode 34 is disposed on the first end surface 13 of the substrate 10, the first terminal electrode 31, the first auxiliary electrode 32, and the first metal thin film layer 33. The first side electrode 34 includes a portion overlapping the first end surface 13, a portion overlapping the first primary surface 11, and a portion overlapping the second primary surface 12. The first side electrode 34 causes the first auxiliary electrode 32 and the first metal thin film layer 33 to be conductive to each other, and the first terminal electrode 31 and the first metal thin film layer 33 to be conductive to each other. The first side electrode 34 is formed by, for example, printing and firing a conductive paste, such as a paste containing silver mixed with glass frit. The first side electrode 34 may be formed by sputtering.

The first plating film 35 is disposed on the first auxiliary electrode 32, the first side electrode 34, and the first metal thin film layer 33. The first plating film 35 includes a first inner plating layer 36 and a first outer plating layer 37. The first inner plating layer 36 is disposed on the first auxiliary electrode 32, the first side electrode 34, and the first metal thin film layer 33. The first inner plating layer 36 provides thermal and impact protection to the first terminal electrode 31, the first auxiliary electrode 32, the first side electrode 34, and the first metal thin film layer 33. The first inner plating layer 36 is a nickel plating layer, for example. The first outer plating layer 37 is disposed on the first inner plating layer 36. The first outer plating layer 37 is formed of a material such as a solder that is more susceptible to adhesion of a bond member than the first inner plating layer 36. The first outer plating layer 37 is a tin plating layer, for example. The bond member adheres to the line pattern formed of the first outer plating layer 37 and the circuit board (not shown), and the chip resistor 1 is thereby mounted on the circuit board.

The second electrode 40 is disposed on the second end surface 14 side of the substrate 10 and connected to the second resistor body 17. The second electrode 40 has a similar electrode structure to the first electrode 30. Specifically, the second electrode 40 includes the second terminal electrode 41, the second auxiliary electrode 42, a second metal thin film layer 43, a second side electrode 44, and a second plating film 45.

The second terminal electrode 41 is disposed on the first primary surface 11 of the substrate 10. The second terminal electrode 41 is closer to the second end surface 14 than the connection electrode 20 is. The second terminal electrode 41 is connected to the second resistor body 17. The second terminal electrode 41 has one end portion between the first primary surface 11 and the second resistor body 17. The second resistor body 17 may have one end portion between the first primary surface 11 and the second terminal electrode 41. The second terminal electrode 41 overlaps the insulating protective film 24 in plan view of the first primary surface 11 of the substrate 10. The second terminal electrode 41, for example, has a rectangular shape in plan view of the first primary surface 11 of the substrate 10. The second terminal electrode 41 is formed by applying and firing a conductive paste, such as a paste containing silver mixed with glass frit on the first primary surface 11 of the substrate 10, for example.

The second auxiliary electrode 42 is disposed on the second terminal electrode 41 and connected to the second terminal electrode 41. The second auxiliary electrode 42 is also disposed on the insulating protective film 24 (the outer insulating protective layer 26). Specifically, the second auxiliary electrode 42 includes a second base 42*a* and a second canopy portion 42*b*. The second base 42*a* is disposed on the second terminal electrode 41 and in contact with the second terminal electrode 41. The second canopy portion 42*b* projects from the second base 42*a* toward the connection electrode 20. The second canopy portion 42*b* is in contact with the insulating protective film 24 (the outer insulating protective layer 26).

The second auxiliary electrode 42 overlaps the second resistor body 17 in plan view of the first primary surface 11 of the substrate 10. A second overlap width $W_{23}$ between the second auxiliary electrode 42 and the second resistor body 17 in the longitudinal direction (x direction) of the substrate 10 is greater than or equal to the second gap $G_2$ between the second resistor body 17 and the second end surface 14 in the longitudinal direction of the substrate 10. The second auxiliary electrode 42 (the second canopy portion 42*b*) overlaps the insulating protective film 24 in plan view of the first primary surface 11 of the substrate 10. A fifth overlap width $W_{24}$ between the second auxiliary electrode 42 and the insulating protective film 24 in the longitudinal direction of the substrate 10 is greater than a sixth overlap width $W_{25}$ between the second terminal electrode 41 and the insulating protective film 24 in the longitudinal direction of the substrate 10.

The second auxiliary electrode 42 has a larger area than the second terminal electrode 41 in plan view of the first primary surface 11 of the substrate 10. A second width $W_{21}$ of the second auxiliary electrode 42 in the longitudinal direction (x direction) of the substrate 10 is greater than a second electrode width $W_{22}$ of the second terminal electrode 41 in the longitudinal direction of the substrate 10. The second width $W_{21}$ of the second auxiliary electrode 42 in the longitudinal direction of the substrate 10 is greater than or equal to the second gap $G_2$ between the second resistor body 17 and the second end surface 14 in the longitudinal direction of the substrate 10. The second auxiliary electrode 42 has a maximum thickness greater than the second terminal electrode 41. The second auxiliary electrode 42 has a greater volume than the second terminal electrode 41. For example, the second auxiliary electrode 42 is formed by applying and firing a conductive paste, such as a silver paste containing a binder resin and silver particles dispersed in the binder resin, on the second terminal electrode 41 and on the insulating protective film 24 (the outer insulating protective layer 26).

The second metal thin film layer 43 is disposed on the second stress relief layer 29. Even if the second stress relief layer 29 is an electrical insulator, the second metal thin film layer 43 enables the second plating film 45 to be formed on the second stress relief layer 29. For example, the second metal thin film layer 43 is formed of a conductive material such as a silver paste containing a binder resin and silver particles dispersed in the binder resin. For example, the second metal thin film layer 43 is formed by printing on the second stress relief layer 29 a conductive paste such as a silver paste containing a binder resin and silver particles dispersed in the binder resin.

The second side electrode 44 is disposed on the second end surface 14 of the substrate 10, the second terminal electrode 41, the second auxiliary electrode 42, and the second metal thin film layer 43. The second side electrode 44 includes a portion overlapping the second end surface 14, a portion overlapping the first primary surface 11, and a portion overlapping the second primary surface 12. The second side electrode 44 causes the second auxiliary electrode 42 and the second metal thin film layer 43 to be conductive to each other, and the second terminal electrode 41 and the second metal thin film layer 43 to be conductive to each other. The second side electrode 44 is formed by, for example, printing and firing a conductive paste, such as a paste containing silver mixed with glass frit. The second side electrode 44 may be formed by sputtering.

The second plating film 45 is disposed on the second auxiliary electrode 42, the second side electrode 44, and the second metal thin film layer 43. The second plating film 45 includes a second inner plating layer 46 and a second outer plating layer 47. The second inner plating layer 46 is disposed on the second auxiliary electrode 42, the second side electrode 44, and the second metal thin film layer 43. The second inner plating layer 46 provides thermal and impact protection to the second terminal electrode 41, the second auxiliary electrode 42, the second side electrode 44, and the second metal thin film layer 43. The second inner plating layer 46 is a nickel plating layer, for example. The second outer plating layer 47 is disposed on the second inner plating layer 46. The second outer plating layer 47 is formed of a material such as a solder that is more susceptible to adhesion of a bond member than the second inner plating layer 46. The second outer plating layer 47 is, for example, a tin plating layer. The bond member adheres to the line pattern formed of the second outer plating layer 47 and the circuit board (not shown), and the chip resistor 1 is thereby mounted on the circuit board.

Referring to FIGS. 1 through 13, one example of a method for fabricating the chip resistor 1 according to the present embodiment is now described.

Figure 3:
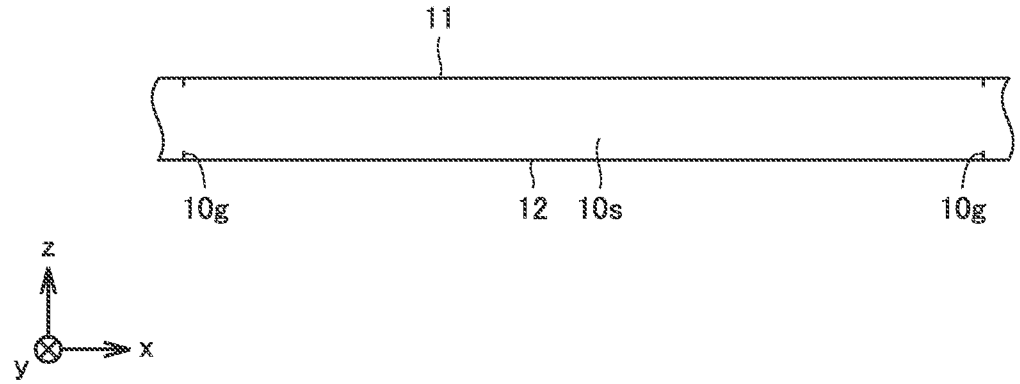
FIG. 3 is a schematic cross-sectional view showing a step of a method for fabricating the chip resistor according to the embodiment.
Figure 4:
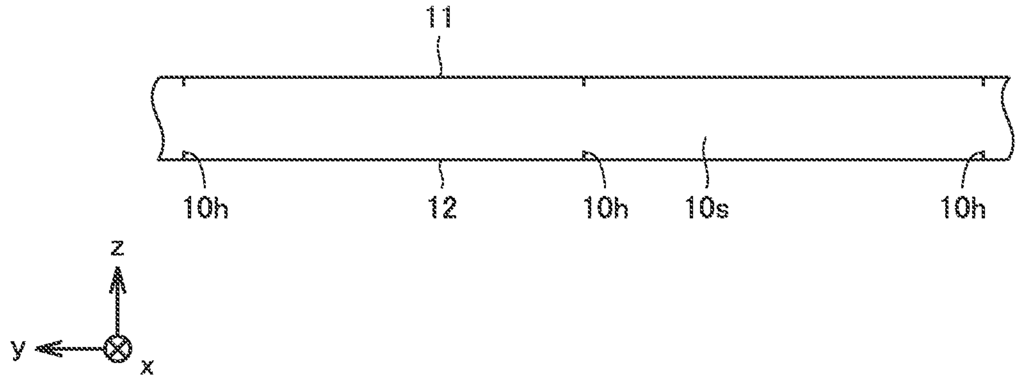
FIG. 4 is a schematic cross-sectional view showing a step of the method for fabricating the chip resistor according to the embodiment.

Referring to FIGS. 3 and 4, a sheet-like substrate **10*s* made of alumina is prepared. The sheet-like substrate 10*s* includes the first primary surface 11 and the second primary surface 12 opposite the first primary surface 11. Multiple first splitting grooves 10*g* and second splitting grooves 10*h* are formed in the first primary surface 11 and the second primary surface 12 of the sheet-like substrate 10*s*. The first splitting grooves 10*g* extend in the second direction (y direction) and are spaced apart from one another in the first direction (x direction). The second splitting grooves 10*h* extend in the first direction (x direction), and are spaced apart from one another in the second direction (y direction). A section demarcated by the first splitting grooves 10*g* and the second splitting grooves 10*h* corresponds to the substrate 10 of the chip resistor 1**.

Figure 5:
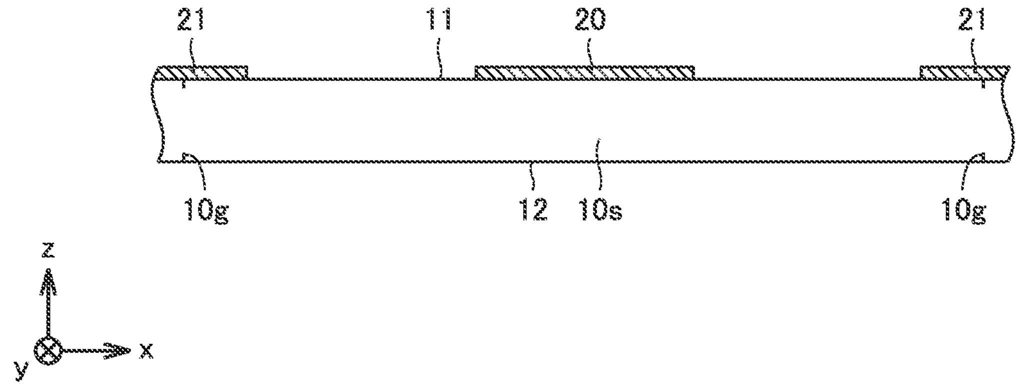
FIG. 5 is a schematic cross-sectional view showing a step subsequent to the steps of FIGS. 3 and 4 included in the method for fabricating the chip resistor according to the embodiment.

Referring to FIG. 5, a terminal electrode 21 and a connection electrode 20 are formed on the first primary surface 11 of the sheet-like substrate **10*s*. The terminal electrode 21 is formed over the first splitting grooves 10*g* on the first primary surface 11 of the sheet-like substrate 10*s*. The connection electrode 20 is formed between a pair of adjacent terminal electrodes 21 in the first direction (x direction). The terminal electrode 21 and the connection electrode 20 are formed by printing and firing a conductive paste, such as a paste containing silver mixed with glass frit on the first primary surface 11**, for example.

Figure 6:
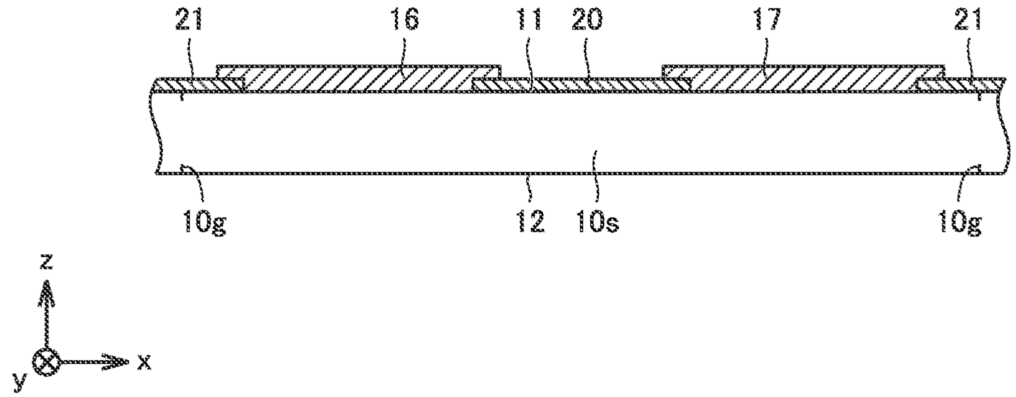
FIG. 6 is a schematic cross-sectional view showing a step subsequent to the step of FIG. 5 included in the method for fabricating the chip resistor according to the embodiment.

Referring to FIG. 6, the first resistor body 16 and the second resistor body 17 are formed on the first primary surface 11 of the sheet-like substrate **10*s*. The first resistor body 16 is in contact with the terminal electrode 21 and the connection electrode 20. The second resistor body 17 is in contact with the terminal electrode 21 and the connection electrode 20. The first resistor body 16 and the second resistor body 17 are spaced apart from each other. The first resistor body 16 and the second resistor body 17 are formed by printing and firing a paste containing an electrically resistive material, such as ruthenium oxide ($RuO_2$) or a silver-palladium alloy, mixed with glass frit. Note that the first resistor body 16 and the second resistor body 17 may be formed on the first primary surface 11 of the sheet-like substrate 10*s*, after which the terminal electrode 21 and the connection electrode 20** may be formed.

Figure 7:
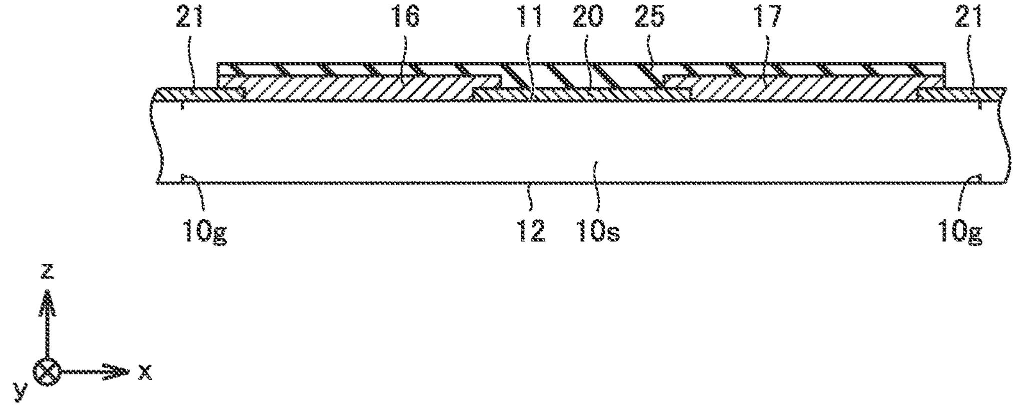
FIG. 7 is a schematic cross-sectional view of a step subsequent to the step of FIG. 6 included in the method for fabricating the chip resistor according to the embodiment.

Referring to FIG. 7, the inner insulating protective layer 25 is formed for covering the first resistor body 16 and the second resistor body 17. The inner insulating protective layer 25 is formed by printing and firing a paste containing glass on the first resistor body 16 and the second resistor body 17, for example. The inner insulating protective layer 25 may further be formed on the connection electrode 20. In the trimming groove formation step illustrated in FIG. 8, the inner insulating protective layer 25 relieves thermal shock acting on the first resistor body 16 and the second resistor body 17, and prevents particulates generated during the formation of the first trimming groove 18 and the second trimming groove 19 from adhering to the first resistor body 16 and the second resistor body 17 and causing a first resistance of the first resistor body 16 and a second resistance of the second resistor body 17 to vary.

Figure 8:
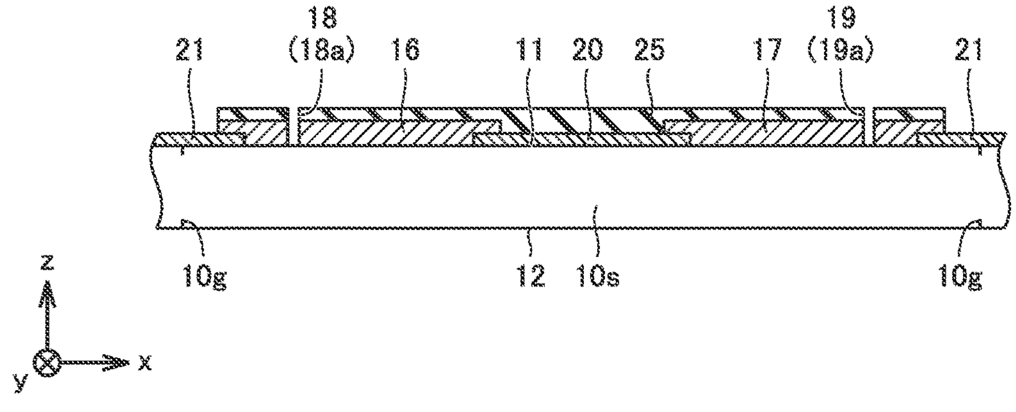
FIG. 8 is a schematic cross-sectional view of a step subsequent to the step of FIG. 7 included in the method for fabricating the chip resistor according to the embodiment.

Referring to FIG. 8, the first trimming groove 18 and the second trimming groove 19 are formed on the first resistor body 16 and the second resistor body 17. The first trimming groove 18 and the second trimming groove 19 are also formed on the inner insulating protective layer 25. The first trimming groove 18 and the second trimming groove 19 are formed by irradiating the first resistor body 16 and the second resistor body 17 with laser light, for example. Specifically, by scanning the laser light along the second direction (y direction), the trimming groove portion **18*a* is formed on the first resistor body 16 and the trimming groove portion 19*a* is formed on the second resistor body 17. Then, by scanning the laser light along the first direction (x direction), the trimming groove portion 18*b* is formed on the first resistor body 16 and the trimming groove portion 19*b* is formed on the second resistor body 17. As the sum of the first resistance of the first resistor body 16 and the second resistance of the second resistor body 17 reaches a target resistance for the chip resistor 1, the formation of the first trimming groove 18 and the second trimming groove 19** ends.

Figure 9:
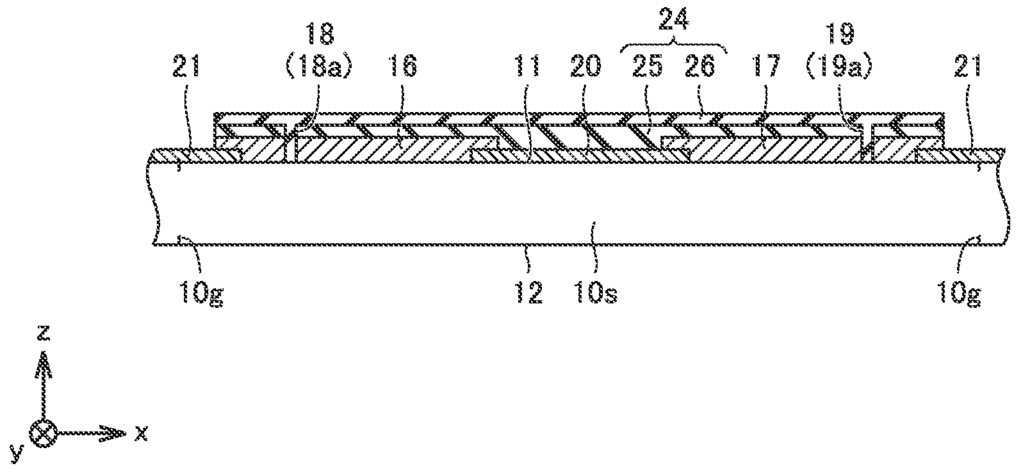
FIG. 9 is a schematic cross-sectional view of a step subsequent to the step of FIG. 8 included in the method for fabricating the chip resistor according to the embodiment.

Referring to FIG. 9, the outer insulating protective layer 26 is formed on the inner insulating protective layer 25. Specifically, the outer insulating protective layer 26 is formed by printing and curing a paste containing an epoxy resin on the inner insulating protective layer 25. The outer insulating protective layer 26 may fill the first trimming groove 18 and the second trimming groove 19. In such a manner, include the insulating protective film 24 that includes the inner insulating protective layer 25 and the outer insulating protective layer 26 is formed.

Figure 10:
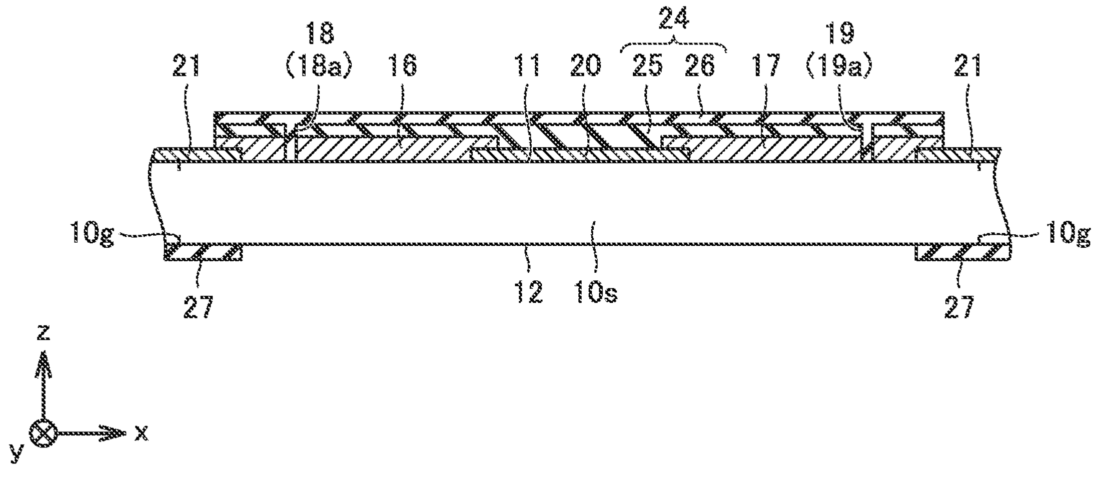
FIG. 10 is a schematic cross-sectional view a step subsequent to the step of FIG. 9 included in the method for fabricating the chip resistor according to the embodiment.

Referring to FIG. 10, the stress relief layer 27 is formed on the second primary surface 12 of the sheet-like substrate 10*s*. The stress relief layer 27 is formed over the first splitting grooves 10*g*. The stress relief layer 27 may have substantially the same shape as the terminal electrode 21 in plan view of the first primary surface 11 (or the second primary surface 12) of the sheet-like substrate 10*s*. The stress relief layer 27 is formed by printing and curing a paste that includes an epoxy resin or a silicone resin on the second primary surface 12.

Figure 11:
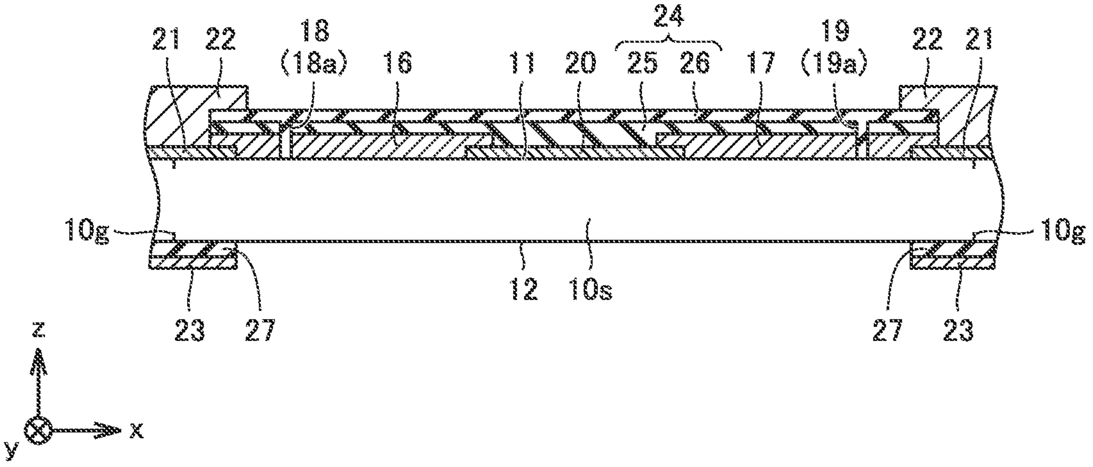
FIG. 11 is a schematic cross-sectional view of a step subsequent to the step of FIG. 10 included in the method for fabricating the chip resistor according to the embodiment.

Referring to FIG. 11, the metal thin film layer 23 is formed on the stress relief layer 27. For example, the metal thin film layer 23 is formed by printing on the second stress relief layer 29 a conductive paste such as a silver paste containing a binder resin and silver particles dispersed in the binder resin.

Referring to FIG. 11, the auxiliary electrode 22 is formed on the terminal electrode 21 and the insulating protective film 24 (the outer insulating protective layer 26). For example, the auxiliary electrode 22 is formed by applying and firing a conductive paste, such as a silver paste containing a binder resin and silver particles dispersed in the binder resin, on the first terminal electrode 31 and on the insulating protective film 24 (the outer insulating protective layer 26). The first auxiliary electrode 32 overlaps the first resistor body 16 in plan view of the first primary surface 11 of the substrate 10.

Figure 12:
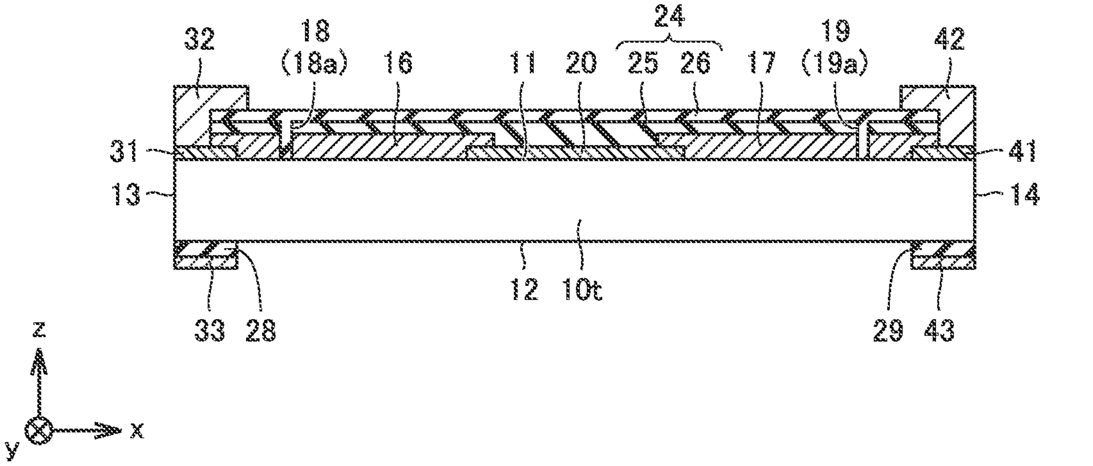
FIG. 12 is a schematic cross-sectional view of a step subsequent to the step of FIG. 11 included in the method for fabricating the chip resistor according to the embodiment.

Referring to FIG. 12, the sheet-like substrate 10*s* is cut into pieces along the first splitting grooves 10*g*. The sheet-like substrate 10*s* is divided into strip-shaped substrates 10*t*. The sheet-like substrate 10*s* is cut along the first splitting grooves 10*g* and the first end surface 13 and the second end surface 14 are thereby formed. Cutting the sheet-like substrate 10*s* along the first splitting grooves 10*g* divides the terminal electrode 21 into the first terminal electrode 31 and the second terminal electrode 41, the auxiliary electrode 22 into the first auxiliary electrode 32 and the second auxiliary electrode 42, and the metal thin film layer 23 into the first metal thin film layer 33 and the second metal thin film layer 43.

Figure 13:
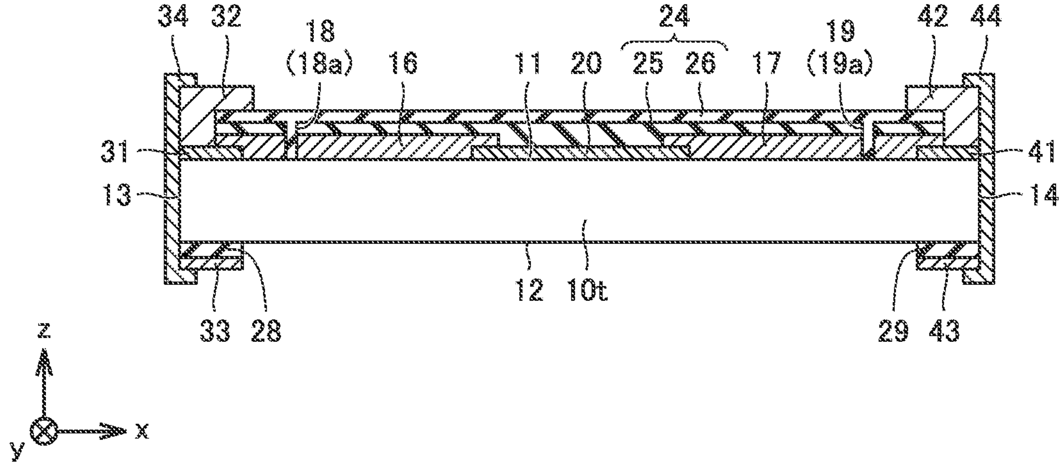
FIG. 13 is a schematic cross-sectional view of a step subsequent to the step of FIG. 12 included in the method for fabricating the chip resistor according to the embodiment.

Referring to FIG. 13, the first side electrode 34 and the second side electrode 44 are formed on the first end surface 13 and the second end surface 14 of the strip-shaped substrate 10*t*. The first side electrode 34 is formed by printing and firing a conductive paste, such as a paste containing silver mixed with glass frit on the first end surface 13, the first terminal electrode 31, the first auxiliary electrode 32, and the first metal thin film layer 33, for example. The second side electrode 44 is formed by printing and firing a conductive paste, such as a paste containing silver mixed with glass frit on the second end surface 14, the second terminal electrode 41, the second auxiliary electrode 42, and the second metal thin film layer 43 on for example. The first side electrode 34 and the second side electrode 44 may be formed by sputtering.

Then, the strip-shaped substrate 10*t* is cut into multiple second splitting grooves 10*h* (see FIG. 4). The strip-shaped substrate 10*t* is divided into multiple substrates 10.

Subsequently, the first plating film 35 and the second plating film 45 are formed. The first plating film 35 is formed on the first auxiliary electrode 32, the first side electrode 34, and the first metal thin film layer 33. The second plating film 45 is formed on the second auxiliary electrode 42, the second side electrode 44, and the second metal thin film layer 43.

Specifically, the first inner plating layer 36 is formed on the first auxiliary electrode 32, the first side electrode 34, and the first metal thin film layer 33. The second inner plating layer 46 is formed on the second auxiliary electrode 42, the second side electrode 44, and the second metal thin film layer 43. The first inner plating layer 36 and the second inner plating layer 46 are nickel plating layers, for example. The first outer plating layer 37 is then formed on the first inner plating layer 36. The second outer plating layer 47 is formed on the second inner plating layer 46. The first outer plating layer 37 and the second outer plating layer 47 are tin plating layers, for example. In such a manner, the chip resistor 1 of FIG. 1 and FIG. 2 is obtained.

Variation

Figure 14:
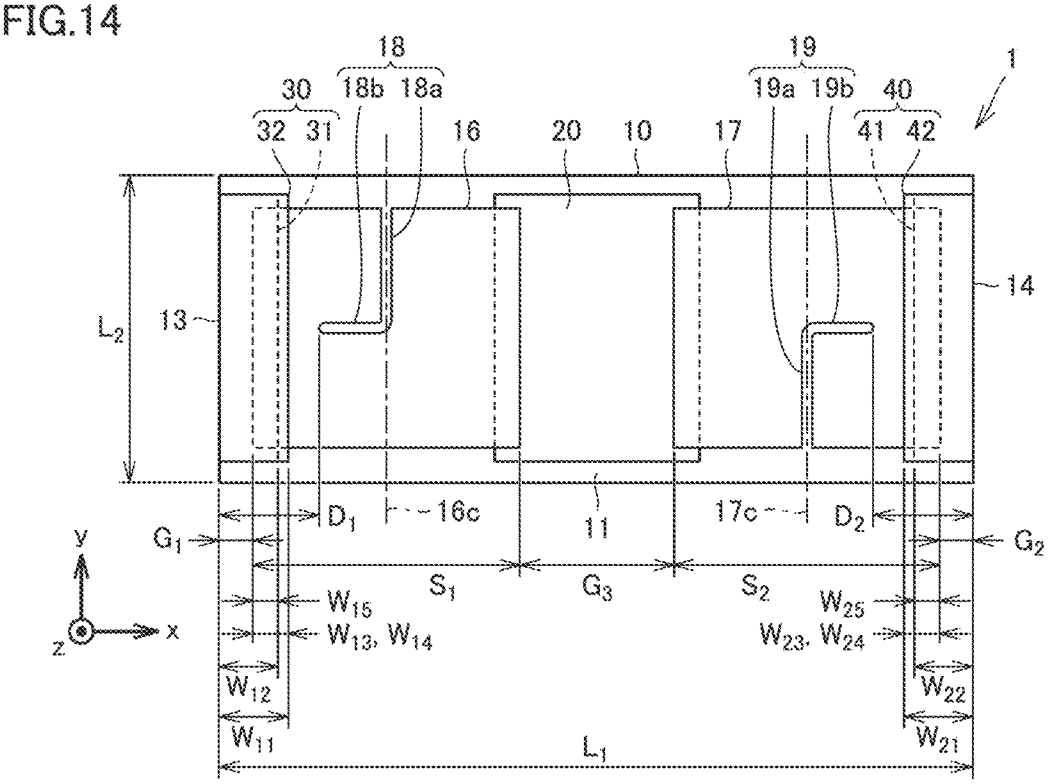
FIG. 14 is a schematic cross-sectional view of the chip resistor according to Variation 1 of the embodiment.

In Variation 1 of the present embodiment, the first trimming groove 18 and the second trimming groove 19 may each have an L shape as shown in FIG. 14 in plan view of the first primary surface 11 of the substrate 10. Specifically, the trimming groove portion 18*b* extends from the trimming groove portion 18*a* toward the first end surface 13 in plan view of the first primary surface 11 of the substrate 10. The shortest distance $D_1$ is the distance between the first end surface 13 and the trimming groove portion 18*b* in the longitudinal direction (x direction) of the substrate 10. The trimming groove portion 19*b* extends from the trimming groove portion 19*a* toward the second end surface 14 in plan view of the first primary surface 11 of the substrate 10. The shortest distance $D_2$ is the distance between the second end surface 14 and the trimming groove portion 19*b* in the longitudinal direction (x direction) of the substrate 10.

Figure 15:
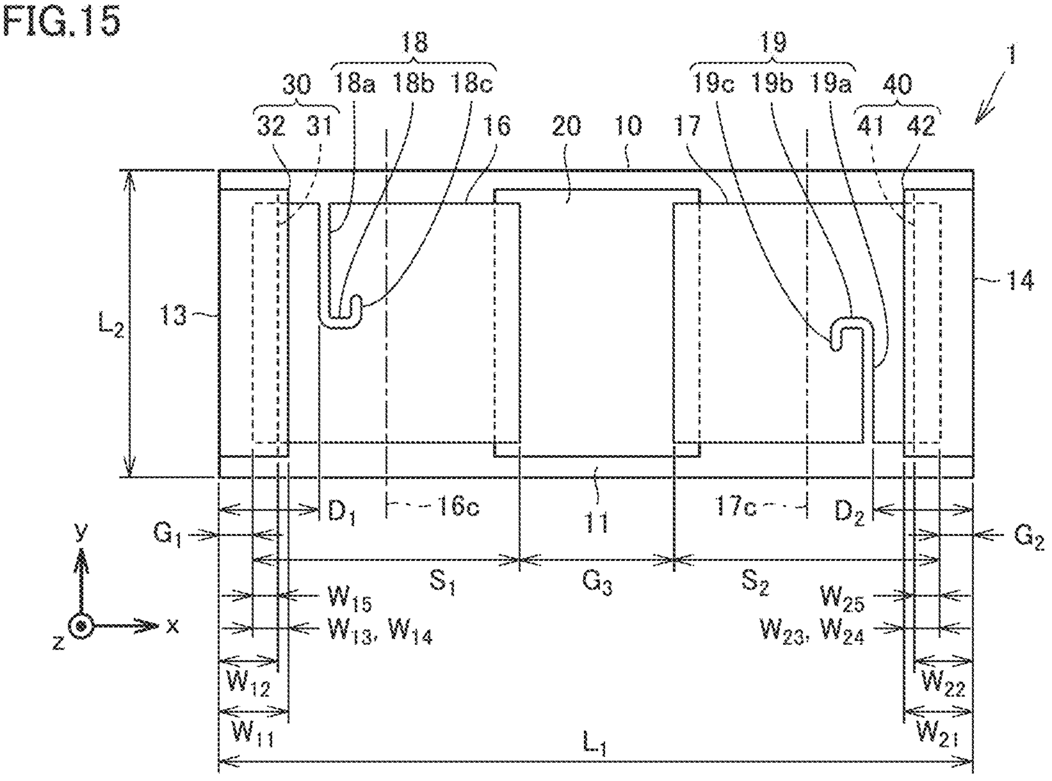
FIG. 15 is a schematic cross-sectional view of the chip resistor according to Variation 2 of the embodiment.

In Variation 2 of the present embodiment, the first trimming groove 18 and the second trimming groove 19 each may have a hook shape as shown in FIG. 15 in plan view of the first primary surface 11 of the substrate 10. Specifically, the first trimming groove 18 includes the trimming groove portion 18*a*, the trimming groove portion 18*b*, and the trimming groove portion 18*c*. The second trimming groove 19 includes the trimming groove portion 19*a*, the trimming groove portion 19*b*, and the trimming groove portion 19*c*.

The trimming groove portion 18*a* extends along the direction (the lateral direction of the substrate 10 (y direction)) perpendicular to the direction (the longitudinal direction of the substrate 10 (x direction)) of the current flowing through the first resistor body 16. The trimming groove portion 18*a* has one end extending to the outer circumference of the first resistor body 16. The trimming groove portion 18*b* extends along the direction (the longitudinal direction of the substrate 10 (x direction)) of the current flowing through the first resistor body 16. The trimming groove portion 18*b* extends from the trimming groove portion 18*a* toward the connection electrode 20 in plan view of the first primary surface 11 of the substrate 10. The trimming groove portion 18*b* has one end connected to the other end of the trimming groove portion 18*a*. The trimming groove portion 18*c* extends along the direction (the lateral direction of the substrate 10 (y direction)) perpendicular to the direction (the longitudinal direction of the substrate 10 (x direction)) of the current flowing through the first resistor body 16. The trimming groove portion 18*b* has the other end connected to the trimming groove portion 18*c*. The shortest distance $D_1$ is the distance between the first end surface 13 and the trimming groove portion 18*a* in the longitudinal direction (x direction) of the substrate 10.

The trimming groove portion 19*a* extends along the direction (the lateral direction of the substrate 10 (y direction)) perpendicular to the direction (the longitudinal direction of the substrate 10 (x direction)) of the current flowing through the second resistor body 17. The trimming groove portion 19*a* has one end extending to the outer circumference of the second resistor body 17. The trimming groove portion 19*b* extends along the direction (the longitudinal direction of the substrate 10 (x direction)) of the current flowing through the second resistor body 17. The trimming groove portion 19*b* extends from the trimming groove portion 19*a* toward the connection electrode 20 in plan view of the first primary surface 11 of the substrate 10. The trimming groove portion 19*b* have one end connected to the other end of the trimming groove portion 19*a*. The trimming groove portion 19*c* extends along the direction (the lateral direction of the substrate 10 (y direction)) perpendicular to the direction (the longitudinal direction of the substrate 10 (x direction)) of the current flowing through the second resistor body 17. The trimming groove portion 19*b* has the other end connected to the trimming groove portion 19*c*. The shortest distance $D_2$ is the distance between the second end surface 14 and the trimming groove portion 19*a* in the longitudinal direction (x direction) of the substrate 10.

Figure 16:
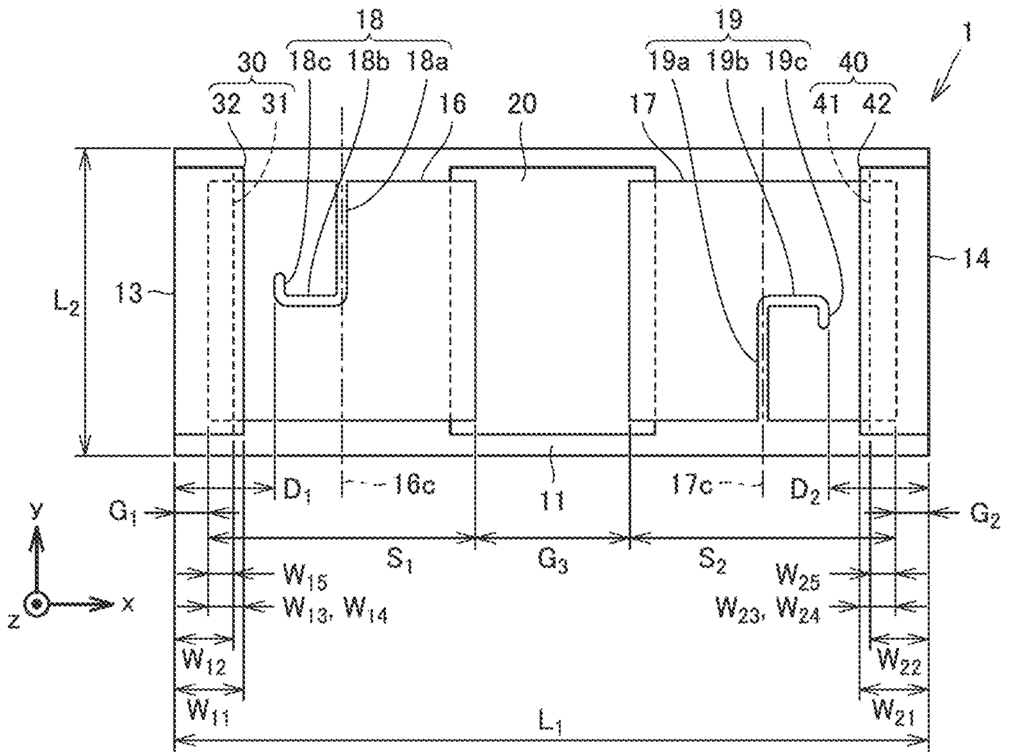
FIG. 16 is a schematic cross-sectional view of the chip resistor according to Variation 3 of the embodiment.

In Variation 3 of the present embodiment, the first trimming groove 18 and the second trimming groove 19 may each have a hook shape as shown in FIG. 16 in plan view of the first primary surface 11 of the substrate 10. Specifically, the first trimming groove 18 includes the trimming groove portion 18*a*, the trimming groove portion 18*b*, and the trimming groove portion 18*c*. The second trimming groove 19 includes the trimming groove portion 19*a*, the trimming groove portion 19*b*, and the trimming groove portion 19*c*.

The first trimming groove 18 according to Variation 3 is the same as the first trimming groove 18 according to Variation 2, except for the following. The trimming groove portion 18*b* extends from the trimming groove portion 18*a* toward the first end surface 13 in plan view of the first primary surface 11 of the substrate 10. The shortest distance $D_1$ is the distance between the first end surface 13 and the trimming groove portion 18*c* in the longitudinal direction (x direction) of the substrate 10.

The second trimming groove 19 according to Variation 3 is the same as the second trimming groove 19 according to Variation 2, except for the following. The trimming groove portion 19*b* extends from the trimming groove portion 19*a* toward the second end surface 14 in plan view of the first primary surface 11 of the substrate 10. The shortest distance $D_2$ is the distance between the second end surface 14 and the trimming groove portion 19*c* in the longitudinal direction (x direction) of the substrate 10.

In Variation 4 according to the present embodiment, the second trimming groove 19 may be omitted.

Advantageous effects of the chip resistor 1 according to the present embodiment are now described.

The chip resistor 1 according to the present embodiment includes the substrate 10, the first electrode 30, the second electrode 40, the first resistor body 16, the second resistor body 17, and the connection electrode 20. The substrate 10 includes the primary surface (the first primary surface 11), the first end surface 13 connected to the primary surface, and the second end surface 14 connected to the primary surface. The first electrode 30 is disposed on the first end surface 13 side of the substrate 10. The second electrode 40 is disposed on the second end surface 14 side of the substrate 10. The first resistor body 16 is deposed on the primary surface of the substrate 10. The second resistor body 17 is disposed on the primary surface of the substrate 10 and spaced apart from the first resistor body 16 in the longitudinal direction (x direction) of the substrate 10 in which the first end surface 13 and the second end surface 14 are spaced apart from each other. The connection electrode 20 is disposed on the primary surface of the substrate 10 and electrically connect in series the first resistor body 16 and the second resistor body 17. The first electrode 30 includes the first terminal electrode 31 and the first auxiliary electrode 32. The first terminal electrode 31 is disposed on the primary surface of the substrate 10 and connected to the first resistor body 16. The first auxiliary electrode 32 is connected to the first terminal electrode 31. The second electrode 40 includes the second terminal electrode 41 and the second auxiliary electrode 42. The second terminal electrode 41 is disposed on the primary surface of the substrate 10 and connected to the second resistor body 17. The second auxiliary electrode 42 is connected to the second terminal electrode 41. The first auxiliary electrode 32 has a larger area than the first terminal electrode 31 and the second auxiliary electrode 42 has a larger area than the second terminal electrode 41, in plan view of the primary surface of the substrate 10.

When the first resistor body 16 is disposed closer to the first end surface 13 of the substrate 10 and the second resistor body 17 is disposed closer to the second end surface 14 of the substrate 10, the first terminal electrode 31 and the second terminal electrode 41 each have a reduced area in plan view of the primary surface (the first primary surface 11) of the substrate 10. However, since the chip resistor 1 includes the first auxiliary electrode 32 having a larger area than the first terminal electrode 31 and the second auxiliary electrode 42 having a larger area than the second terminal electrode 41 in plan view of the primary surface of the substrate 10. Consequently, heat generated at the first resistor body 16 and the second resistor body 17 can be dissipated in an efficient manner through the first electrode 30 and the second electrode 40 out of the chip resistor 1, even if the first terminal electrode 31 and the second terminal electrode 41 have reduced areas in plan view of the primary surface of the substrate 10. The chip resistor 1 can have improved heat dissipation. In addition, since the chip resistor 1 has improved heat dissipation, the chip resistor 1 can have improved STOL (Short-Time Overload) characteristics.

The first auxiliary electrode 32 overlaps the first resistor body 16 and the second auxiliary electrode 42 overlaps the second resistor body 17 in plan view of the primary surface (the first primary surface 11) of the substrate 10.

Consequently, the first auxiliary electrode 32 and the second auxiliary electrode 42 have large areas in plan view of the primary surface (the first primary surface 11) of the substrate 10. Heat generated at the first resistor body 16 and the second resistor body 17 can be dissipated in an efficient manner through the first electrode 30 and the second electrode 40 out of the chip resistor 1. The chip resistor 1 can have improved heat dissipation. The chip resistor 1 can also have improved STOL characteristics.

In the chip resistor 1 according to the present embodiment, the first gap $G_1$ between the first resistor body 16 and the first end surface 13 in the longitudinal direction (x direction) of the substrate 10 in plan view of the primary surface (the first primary surface 11) of the substrate 10 is less than or equal to 0.3 mm if the dimension $L_1$ of the substrate 10 in the longitudinal direction (x direction) of the substrate 10 is greater than or equal to 1.6 mm, and less than or equal to 0.15 mm if the dimension $L_1$ of the substrate 10 in the longitudinal direction (x direction) of the substrate 10 is greater than or equal to 0.6 mm and less than 1.6 mm. The second gap $G_2$ between the second resistor body 17 and the second end surface 14 in the longitudinal direction of the substrate 10 in plan view of the primary surface of the substrate 10 is less than or equal to 0.3 mm if the dimension $L_1$ of the substrate 10 in the longitudinal direction (x direction) of the substrate 10 is greater than or equal to 1.6 mm, and less than or equal to 0.15 mm if the dimension $L_1$ of the substrate 10 in the longitudinal direction (x direction) of the substrate 10 is greater than or equal to 0.6 mm and less than 1.6 mm.

Consequently, the first resistor body 16 is disposed closer to the first end surface 13 of the substrate 10 and the second resistor body 17 is disposed closer to the second end surface 14 of the substrate 10. The heat generated at the first resistor body 16 and the second resistor body 17 can be dissipated out of the chip resistor 1 in an efficient manner. The chip resistor 1 can have improved heat dissipation. The chip resistor 1 can also have improved STOL characteristics.

In the chip resistor 1 according to the present embodiment, the first width $W_{11}$ of the first auxiliary electrode 32 in the longitudinal direction (x direction) of the substrate 10 is greater than the first electrode width $W_{12}$ of the first terminal electrode 31 in the longitudinal direction of the substrate 10. The second width $W_{21}$ of the second auxiliary electrode 42 in the longitudinal direction of the substrate 10 is greater than the second electrode width $W_{22}$ of the second terminal electrode 41 in the longitudinal direction of the substrate 10.

Consequently, the first auxiliary electrode 32 and the second auxiliary electrode 42 have large areas in plan view of the primary surface (the first primary surface 11) of the substrate 10. The heat generated at the first resistor body 16 and the second resistor body 17 can be dissipated in an efficient manner through the first electrode 30 and the second electrode 40 out of the chip resistor 1. The chip resistor 1 can have improved heat dissipation. The chip resistor 1 can also have improved STOL characteristics.

In the chip resistor 1 according to the present embodiment, the first width $W_{11}$ of the first auxiliary electrode 32 in the longitudinal direction (x direction) of the substrate 10 is greater than or equal to the first gap $G_1$ between the first resistor body 16 and the first end surface 13 in the longitudinal direction of the substrate 10. The second width $W_{21}$ of the second auxiliary electrode 42 in the longitudinal direction of the substrate 10 is greater than or equal to the second gap $G_2$ between the second resistor body 17 and the second end surface 14 in the longitudinal direction of the substrate 10.

Consequently, the first auxiliary electrode 32 and the second auxiliary electrode 42 have large areas in plan view of the primary surface (the first primary surface 11) of the substrate 10. The first resistor body 16 is disposed closer to the first end surface 13 of the substrate 10 and the second resistor body 17 is disposed closer to the second end surface 14 of the substrate 10. The heat generated at the first resistor body 16 and the second resistor body 17 can be dissipated out of the chip resistor 1 in an efficient manner. The chip resistor 1 can have improved heat dissipation. The chip resistor 1 can also have improved STOL characteristics.

In the chip resistor 1 according to the present embodiment, the first overlap width $W_{13}$ between the first auxiliary electrode 32 and the first resistor body 16 in the longitudinal direction (x direction) of the substrate 10 is greater than or equal to the first gap $G_1$ between the first resistor body 16 and the first end surface 13 in the longitudinal direction of the substrate 10. The second overlap width $W_{23}$ between the second auxiliary electrode 42 and the second resistor body 17 in the longitudinal direction of the substrate 10 is greater than or equal to the second gap $G_2$ between the second resistor body 17 and the second end surface 14 in the longitudinal direction of the substrate 10.

Consequently, the first auxiliary electrode 32 and the second auxiliary electrode 42 have large areas in plan view of the primary surface (the first primary surface 11) of the substrate 10. The first resistor body 16 is disposed closer to the first end surface 13 of the substrate 10 and the second resistor body 17 is disposed closer to the second end surface 14 of the substrate 10. The heat generated at the first resistor body 16 and the second resistor body 17 can be dissipated out of the chip resistor 1 in an efficient manner. The chip resistor 1 can have improved heat dissipation. The chip resistor 1 can also have improved STOL characteristics.

The chip resistor 1 according to the present embodiment further includes the insulating protective film 24 covering the first resistor body 16 and the second resistor body 17. The insulating protective film 24 is located between the first auxiliary electrode 32 and the first resistor body 16 and between the second auxiliary electrode 42 and the second resistor body 17.

Since the first auxiliary electrode 32 and the second auxiliary electrode 42 are disposed on the insulating protective film 24, the first auxiliary electrode 32 and the second auxiliary electrode 42 have large areas in plan view of the primary surface (the first primary surface 11) of the substrate 10. The heat generated at the first resistor body 16 and the second resistor body 17 can be dissipated in an efficient manner through the first electrode 30 and the second electrode 40 out of the chip resistor 1.

The chip resistor 1 can have improved heat dissipation. The chip resistor 1 can also have improved STOL characteristics. Since the insulating protective film 24 protects the first resistor body 16 and the second resistor body 17, the performance of the chip resistor 1 is stabilized and the chip resistor 1 has an extended life.

In the chip resistor 1 according to the present embodiment, the first auxiliary electrode 32 and the first terminal electrode 31 overlap the insulating protective film 24 and the second auxiliary electrode 42 and the second terminal electrode 41 overlap the insulating protective film 24, in plan view of the primary surface (the first primary surface 11) of the substrate 10. The third overlap width $W_{14}$ between the first auxiliary electrode 32 and the insulating protective film 24 in the longitudinal direction (x direction) of the substrate 10 is greater than the fourth overlap width $W_{15}$ between the first terminal electrode 31 and the insulating protective film 24 in the longitudinal direction of the substrate 10. The fifth overlap width $W_{24}$ between the second auxiliary electrode 42 and the insulating protective film 24 in the longitudinal direction of the substrate 10 is greater than the sixth overlap width $W_{25}$ between the second terminal electrode 41 and the insulating protective film 24 in the longitudinal direction of the substrate 10.

Consequently, the first auxiliary electrode 32 and the second auxiliary electrode 42 have large areas in plan view of the primary surface (the first primary surface 11) of the substrate 10. The heat generated at the first resistor body 16 and the second resistor body 17 can be dissipated in an efficient manner through the first electrode 30 and the second electrode 40 out of the chip resistor 1. The chip resistor 1 can have improved heat dissipation. The chip resistor 1 can also have improved STOL characteristics.

The chip resistor 1 according to the present embodiment includes the substrate 10, the first electrode 30, the second electrode 40, the first resistor body 16, the second resistor body 17, and the connection electrode 20. The substrate 10 includes the primary surface (the first primary surface 11), the first end surface 13 connected to the primary surface, and the second end surface 14 connected to the primary surface. The first electrode 30 is disposed on the first end surface 13 side of the substrate 10. The second electrode 40 is disposed on the second end surface 14 side of the substrate 10. The first resistor body 16 is disposed on the primary surface of the substrate 10. The second resistor body 17 is disposed on the primary surface of the substrate 10 and spaced apart from the first resistor body 16 in the longitudinal direction (x direction) of the substrate 10 in which the first end surface 13 and the second end surface 14 are spaced apart from each other. The connection electrode 20 is disposed on the primary surface of the substrate 10 and electrically connects in series the first resistor body 16 and the second resistor body 17. The first electrode 30 includes the first terminal electrode 31. The first terminal electrode 31 is disposed on the primary surface of the substrate 10 and connected to the first resistor body 16. The second electrode 40 includes the second terminal electrode 41. The second terminal electrode 41 is disposed on the primary surface of the substrate 10 and connected to the second resistor body 17. The first gap $G_1$ between the first resistor body 16 and the first end surface 13 in the longitudinal direction of the substrate 10 in plan view of the primary surface of the substrate 10 is less than or equal to 0.3 mm if the dimension $L_1$ of the substrate 10 in the longitudinal direction (x direction) of the substrate 10 is greater than or equal to 1.6 mm, and less than or equal to 0.15 mm if the dimension $L_1$ of the substrate 10 in the longitudinal direction (x direction) of the substrate 10 is greater than or equal to 0.6 mm and less than 1.6 mm. The second gap $G_2$ between the second resistor body 17 and the second end surface 14 in the longitudinal direction of the substrate 10 in plan view of the primary surface of the substrate 10 is less than or equal to 0.3 mm if the dimension $L_1$ of the substrate 10 in the longitudinal direction (x direction) of the substrate 10 is greater than or equal to 1.6 mm and less than or equal to 0.15 mm if the dimension $L_1$ of the substrate 10 in the longitudinal direction (x direction) of the substrate 10 is greater than or equal to 0.6 mm and less than 1.6 mm.

Consequently, the first resistor body 16 is disposed closer to the first end surface 13 of the substrate 10 and the second resistor body 17 is disposed closer to the second end surface 14 of the substrate 10. The heat generated at the first resistor body 16 and the second resistor body 17 can be dissipated in an efficient manner out of the chip resistor 1. The chip resistor 1 can have improved heat dissipation. The chip resistor 1 also has an improve heat dissipation, and the chip resistor 1 thus can have improved STOL characteristics as well.

In the chip resistor 1 according to the present embodiment, the first gap $G_1$ between the first resistor body 16 and the first end surface 13 and the second gap $G_2$ between the second resistor body 17 and the second end surface 14 are less than the third gap $G_3$ between the first resistor body 16 and the second resistor body 17 in the longitudinal direction (x direction) of the substrate 10.

Consequently, the first resistor body 16 is deposed closer to the first end surface 13 of the substrate 10 and the second resistor body 17 is deposed closer to the second end surface 14 of the substrate 10. The heat generated at the first resistor body 16 and the second resistor body 17 can be dissipated in an efficient manner out of the chip resistor 1. The chip resistor 1 can have improved heat dissipation. The chip resistor 1 can also have improved STOL characteristics.

In the chip resistor 1 according to the present embodiment, the first trimming groove 18 is formed in the first resistor body 16. The shortest distance $D_1$ between the first end surface 13 and the first trimming groove 18 in the longitudinal direction (x direction) of the substrate 10 is less than or equal to the sum of the first gap $G_1$ and one third of the dimension $S_1$ of the first resistor body 16 in the longitudinal direction (x direction) of the substrate 10.

As the current flows through the chip resistor 1, a portion of the first resistor body 16 that is around the first trimming groove 18 has the highest temperature in the first resistor body 16. The chip resistor 1 includes the first trimming groove 18 disposed closer to the first end surface 13 of the substrate 10. Consequently, the heat generated at the first resistor body 16 can be dissipated out of the chip resistor 1 in an efficient manner. The chip resistor 1 can have improved heat dissipation. The chip resistor 1 can also have improved STOL characteristics. Forming the first trimming groove 18 in the first resistor body 16 allows accurate determination of the resistance of the chip resistor 1 (the first resistor body 16).

In the chip resistor 1 according to the present embodiment, the second trimming groove 19 is formed in the second resistor body 17. The shortest distance $D_2$ between the second end surface 14 and the second trimming groove 19 in the longitudinal direction (x direction) of the substrate 10 is less than or equal to the sum of the second gap $G_2$ and one third of the dimension $S_2$ of the second resistor body 17 in the longitudinal direction (x direction) of the substrate 10.

As the current flows through the chip resistor 1, a portion of the second resistor body 17 that is around the second trimming groove 19 has the highest temperature in the second resistor body 17. The chip resistor 1 includes the second trimming groove 19 disposed closer to the second end surface 14 of the substrate 10. Consequently, the heat generated at the second resistor body 17 can be dissipated out of the chip resistor 1 in an efficient manner. The chip resistor 1 can have improved heat dissipation. The chip resistor 1 can also have improved STOL characteristics. Forming the second trimming groove 19 in the second resistor body 17 allows accurate determination of the resistance of the chip resistor 1 (the second resistor body 17).

In the chip resistor 1 according to the present embodiment, the first trimming groove 18 is formed in the first resistor body 16. The first groove portion (e.g., any of the trimming groove portions 18*a*, 18*b*, and 18*c*) of the first trimming groove 18 having a shortest distance from the first end surface 13 is closer to the first end surface 13 than the first centerline 16*c* of the first resistor body 16 is in the longitudinal direction (x direction) of the substrate 10.

As the current flows through the chip resistor 1, a portion of the first resistor body 16 that is around the first trimming groove 18 has the highest temperature in the first resistor body 16. The chip resistor 1 includes the first trimming groove 18 disposed closer to the first end surface 13 of the substrate 10. Consequently, the heat generated at the first resistor body 16 can be dissipated out of the chip resistor 1 in an efficient manner. The chip resistor 1 can have improved heat dissipation. The chip resistor 1 can also have improved STOL characteristics. Forming the first trimming groove 18 in the first resistor body 16 allows accurate determination of the resistance of the chip resistor 1 (the first resistor body 16).

In the chip resistor 1 according to the present embodiment, the second trimming groove 19 is formed in the second resistor body 17. The second groove portion (e.g., any of the trimming groove portions 19*a*, 19*b*, and 19*c*) of the second trimming groove 19 having a shortest distance from the second end surface 14 is closer to the second end surface 14 than the second centerline 17*c* of the second resistor body 17 is in the longitudinal direction (x direction) of the substrate 10.

As the current flows through the chip resistor 1, a portion of the second resistor body 17 that is around the second trimming groove 19 the highest temperature in the second resistor body 17. The chip resistor 1 includes the second trimming groove 19 disposed closer to the second end surface 14 of the substrate 10. Consequently, the heat generated at the second resistor body 17 can be dissipated out of the chip resistor 1 in an efficient manner. The chip resistor 1 can have improved heat dissipation. The chip resistor 1 can also have improved STOL characteristics. Forming the second trimming groove 19 in the second resistor body 17 allows accurate determination of the resistance of the chip resistor 1 (the second resistor body 17).

The presently disclosed embodiments above and the variations thereof should be considered illustrative in all aspects and do not limit the present disclosure. The scope of the present disclosure is defined by the appended claims, rather than by the above description. All changes which come within the meaning and range of equivalency of the appended claims are intended to be embraced within their scope.

REFERENCE SIGNS LIST

1 chip resistor; 10 substrate; 10*g* first splitting groove; 10*h* second splitting groove; 10*s* sheet-like substrate; 10*t* strip-shaped substrate; 11 first primary surface; 12 second primary surface; 13 first end surface; 14 second end surface; 16 first resistor body; 16*c* first centerline; 17 second resistor body; 17*c* second centerline; 18 first trimming groove; 18*a*, 18*b*, 19*a*, 19*b* trimming groove portion; 19 second trimming groove; 20 connection electrode; 21 terminal electrode; 22 auxiliary electrode; 23 metal thin film layer; 24 insulating protective film; 25 inner insulating protective layer; 26 outer insulating protective layer; 27 stress relief layer; 28 first stress relief layer; 29 second stress relief layer; 30 first electrode; 31 first terminal electrode; 32 first auxiliary electrode; 32*a* first base; 32*b* first canopy portion; 33 first metal thin film layer; 34 first side electrode; 35 first plating film; 36 first inner plating layer; 37 first outer plating layer; 40 second electrode; 41 second terminal electrode; 42 second auxiliary electrode; 42*a* second base; 42*b* second canopy portion; 43 second metal thin film layer; 44 second side electrode; 45 second plating film; 46 second inner plating layer; and 47 second outer plating layer.

The invention claimed is:

1. A chip resistor, comprising:

a substrate which includes a primary surface, a first end surface connected to the primary surface, and a second end surface connected to the primary surface;

a first electrode disposed on a first end surface side of the substrate;

a second electrode disposed on a second end surface side of the substrate;

a first resistor body disposed on the primary surface;

a second resistor body disposed on the primary surface and spaced apart from the first resistor body in a longitudinal direction of the substrate in which the first end surface and the second end surface are spaced apart from each other; and a connection electrode that is disposed on the primary surface and electrically connects in series the first resistor body and the second resistor body, wherein the first electrode includes a first terminal electrode and a first auxiliary electrode, the first terminal electrode is disposed on the primary surface and connected to the first resistor body, the first auxiliary electrode is connected to the first terminal electrode, the second electrode includes a second terminal electrode and a second auxiliary electrode, the second terminal electrode is disposed on the primary surface and connected to the second resistor body, the second auxiliary electrode is connected to the second terminal electrode, the first auxiliary electrode has a larger area than the first terminal electrode and the second auxiliary electrode has a larger area than the second terminal electrode, in plan view of the primary surface, a first gap between the first resistor body and the first end surface in the longitudinal direction of the substrate in the plan view of the primary surface is less than or equal to 0.3 mm when a dimension of the substrate in the longitudinal direction of the substrate is greater than or equal to 1.6 mm, and less than or equal to 0.15 mm when the dimension of the substrate in the longitudinal direction of the substrate is greater than or equal to 0.6 mm and less than 1.6 mm, and a second gap between the second resistor body and the second end surface in the longitudinal direction of the substrate in the plan view of the primary surface is less than or equal to 0.3 mm when the dimension of the substrate in the longitudinal direction of the substrate is greater than or equal to 1.6 mm, and less than or equal to 0.15 mm when the dimension of the substrate in the longitudinal direction of the substrate is greater than or equal to 0.6 mm and less than 1.6 mm.

2. The chip resistor according to claim 1, wherein the first auxiliary electrode overlaps the first resistor body and the second auxiliary electrode overlaps the second resistor body, in the plan view of the primary surface.

3. The chip resistor according to claim 1, wherein a first width of the first auxiliary electrode in the longitudinal direction of the substrate is greater than a first electrode width of the first terminal electrode in the longitudinal direction of the substrate, and a second width of the second auxiliary electrode in the longitudinal direction of the substrate is greater than a second electrode width of the second terminal electrode in the longitudinal direction of the substrate.

4. The chip resistor according to claim 1, wherein a first width of the first auxiliary electrode in the longitudinal direction of the substrate is greater than or equal to a first gap between the first resistor body and the first end surface in the longitudinal direction of the substrate, and a second width of the second auxiliary electrode in the longitudinal direction of the substrate is greater than or equal to a second gap between the second resistor body and the second end surface in the longitudinal direction of the substrate.

5. The chip resistor according to claim 1, wherein a first overlap width between the first auxiliary electrode and the first resistor body in the longitudinal direction of the substrate is greater than or equal to a first gap between the first resistor body and the first end surface in the longitudinal direction of the substrate, and a second overlap width between the second auxiliary electrode and the second resistor body in the longitudinal direction of the substrate is greater than or equal to a second gap between the second resistor body and the second end surface in the longitudinal direction of the substrate.

6. The chip resistor according to claim 1, wherein the first gap and the second gap are less than a third gap between the first resistor body and the second resistor body in the longitudinal direction of the substrate.

7. The chip resistor according to claim 1, wherein a first trimming groove is formed in the first resistor body, and a first groove portion that has a shortest distance from the first end surface in the first trimming groove is closer to the first end surface than a first centerline of the first resistor body in the longitudinal direction of the substrate is.

8. The chip resistor according to claim 7, wherein a second trimming groove is formed in the second resistor body, and a second groove portion that has a shortest distance from the second end surface in the second trimming groove is closer to the second end surface than a second centerline of the second resistor body in the longitudinal direction of the substrate is.

9. A chip resistor, comprising:

a substrate which includes a primary surface, a first end surface connected to the primary surface, and a second end surface connected to the primary surface;

a first electrode disposed on a first end surface side of the substrate;

a second electrode disposed on a second end surface side of the substrate;

a first resistor body disposed on the primary surface;

a second resistor body disposed on the primary surface and spaced apart from the first resistor body in a longitudinal direction of the substrate in which the first end surface and the second end surface are spaced apart from each other;

a connection electrode that is disposed on the primary surface and electrically connects in series the first resistor body and the second resistor body; and an insulating protective film covering the first resistor body and the second resistor body, wherein the first electrode includes a first terminal electrode and a first auxiliary electrode, the first terminal electrode is disposed on the primary surface and connected to the first resistor body, the first auxiliary electrode is connected to the first terminal electrode, the second electrode includes a second terminal electrode and a second auxiliary electrode, the second terminal electrode is disposed on the primary surface and connected to the second resistor body, the second auxiliary electrode is connected to the second terminal electrode, the first auxiliary electrode has a larger area than the first terminal electrode and the second auxiliary electrode has a larger area than the second terminal electrode, in plan view of the primary surface, the insulating protective film is disposed between the first auxiliary electrode and the first resistor body and between the second auxiliary electrode and the second resistor body, the first auxiliary electrode and the first terminal electrode overlap the insulating protective film and the second auxiliary electrode and the second terminal electrode overlap the insulating protective film, in the plan view of the substrate, a third overlap width between the first auxiliary electrode and the insulating protective film in the longitudinal direction of the substrate is greater than a fourth overlap width between the first terminal electrode and the insulating protective film in the longitudinal direction of the substrate, and a fifth overlap width between the second auxiliary electrode and the insulating protective film in the longitudinal direction of the substrate is greater than a sixth overlap width between the second terminal electrode and the insulating protective film in the longitudinal direction of the substrate.

10. A chip resistor, comprising:

a substrate which includes a primary surface, a first end surface connected to the primary surface, and a second end surface connected to the primary surface;

a first electrode disposed on a first end surface side of the substrate;

a second electrode disposed on a second end surface side of the substrate;

a first resistor body disposed on the primary surface;

a second resistor body disposed on the primary surface and spaced apart from the first resistor body in a longitudinal direction of the substrate in which the first end surface and the second end surface are spaced apart from each other; and a connection electrode which is disposed on the primary surface and electrically connects in series the first resistor body and the second resistor body, wherein the first electrode includes a first terminal electrode, the first terminal electrode is disposed on the primary surface and connected to the first resistor body, the second electrode includes a second terminal electrode, the second terminal electrode is disposed on the primary surface and connected to the second resistor body, a first gap between the first resistor body and the first end surface in the longitudinal direction of the substrate in plan view of the primary surface is less than or equal to 0.3 mm when a dimension of the substrate in the longitudinal direction of the substrate is greater than or equal to 1.6 mm, and less than or equal to 0.15 mm when the dimension of the substrate in the longitudinal direction of the substrate is greater than or equal to 0.6 mm and less than 1.6 mm, and a second gap between the second resistor body and the second end surface in the longitudinal direction of the substrate in in the plan view of the primary surface is less than or equal to 0.3 mm when the dimension of the substrate in the longitudinal direction of the substrate is greater than or equal to 1.6 mm, and less than or equal to 0.15 mm when the dimension of the substrate in the longitudinal direction of the substrate is greater than or equal to 0.6 mm and less than 1.6 mm.

11. The chip resistor according to claim 10, wherein a first trimming groove is formed in the first resistor body, and a shortest distance between the first end surface and the first trimming groove in the longitudinal direction of the substrate is less than or equal to a sum of the first gap and one third of a dimension of the first resistor body in the longitudinal direction of the substrate.

12. The chip resistor according to claim 11, wherein a second trimming groove is formed in the second resistor body, and a shortest distance between the second end surface and the second trimming groove in the longitudinal direction of the substrate is less than or equal to a sum of the second gap and one third of a dimension of the second resistor body in the longitudinal direction of the substrate.

13. The chip resistor according to claim 10, wherein the first gap and the second gap are less than a third gap between the first resistor body and the second resistor body in the longitudinal direction of the substrate.

14. The chip resistor according to claim 13, wherein a first trimming groove is formed in the first resistor body, and a shortest distance between the first end surface and the first trimming groove in the longitudinal direction of the substrate is less than or equal to a sum of the first gap and one third of a dimension of the first resistor body in the longitudinal direction of the substrate.

15. The chip resistor according to claim 10, wherein a first trimming groove is formed in the first resistor body, and a first groove portion that has a shortest distance from the first end surface in the first trimming groove is closer to the first end surface than a first centerline of the first resistor body in the longitudinal direction of the substrate is.

16. The chip resistor according to claim 15, wherein a second trimming groove is formed in the second resistor body, and a second groove portion that has a shortest distance from the second end surface in the second trimming groove is closer to the second end surface than a second centerline of the second resistor body in the longitudinal direction of the substrate is.

17. The chip resistor according to claim 10, wherein the first electrode further includes a first auxiliary electrode, the first auxiliary electrode is connected to the first terminal electrode, the first auxiliary electrode has a maximum thickness greater than a maximum thickness of the first terminal electrode, the second electrode further includes a second auxiliary electrode, the second auxiliary electrode is connected to the second terminal electrode, and the second auxiliary electrode has a maximum thickness greater than the second terminal electrode.

18. A chip resistor, comprising:

a substrate which includes a primary surface, a first end surface connected to the primary surface, and a second end surface connected to the primary surface;

a first electrode disposed on a first end surface side of the substrate;

a second electrode disposed on a second end surface side of the substrate;

a first resistor body disposed on the primary surface;

a second resistor body disposed on the primary surface and spaced apart from the first resistor body in a longitudinal direction of the substrate in which the first end surface and the second end surface are spaced apart from each other; and a connection electrode that is disposed on the primary surface and electrically connects in series the first resistor body and the second resistor body, wherein the first electrode includes a first terminal electrode and a first auxiliary electrode, the first terminal electrode is disposed on the primary surface and connected to the first resistor body, the first auxiliary electrode is connected to the first terminal electrode, the second electrode includes a second terminal electrode and a second auxiliary electrode, the second terminal electrode is disposed on the primary surface and connected to the second resistor body, the second auxiliary electrode is connected to the second terminal electrode, the first auxiliary electrode has a larger area than the first terminal electrode and the second auxiliary electrode has a larger area than the second terminal electrode, in plan view of the primary surface, a first trimming groove is formed in the first resistor body, and a shortest distance between the first end surface and the first trimming groove in the longitudinal direction of the substrate is less than or equal to a sum of a first gap between the first resistor body and the first end surface in the longitudinal direction of the substrate and one third of a dimension of the first resistor body in the longitudinal direction of the substrate.

19. The chip resistor according to claim 18, wherein a second trimming groove is formed in the second resistor body, a shortest distance between the second end surface and the second trimming groove in the longitudinal direction of the substrate is less than or equal to a sum of a second gap between the second resistor body and the second end surface in the longitudinal direction of the substrate and one third of a dimension of the second resistor body in the longitudinal direction of the substrate.

* * * * *